US008200520B2

(12) United States Patent
Chen et al.

(10) Patent No.: US 8,200,520 B2
(45) Date of Patent: Jun. 12, 2012

(54) METHODS, SYSTEMS, AND APPARATUSES FOR AUTOMATED CONFIRMATIONS OF MEETINGS

(75) Inventors: Yen-Fu Chen, Austin, TX (US); Fabian F. Morgan, Austin, TX (US); Keith R. Walker, Austin, TX (US); Sarah V. White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 11/866,578

(22) Filed: Oct. 3, 2007

(65) Prior Publication Data

US 2009/0094088 A1    Apr. 9, 2009

(51) Int. Cl.
*G06Q 10/00*    (2012.01)
(52) U.S. Cl. .............. 705/7.19; 705/7.18; 705/7.21; 705/7.24; 705/7.22; 705/7.23
(58) Field of Classification Search ......... 705/7.18–7.24
See application file for complete search history.

(56) References Cited

U.S. PATENT DOCUMENTS

| | | | |
|---|---|---|---|
| 4,445,181 A | 4/1984 | Yatman | |
| 4,489,958 A | 12/1984 | Martin | |
| 4,591,840 A | 5/1986 | Curtis et al. | |
| 4,626,836 A | 12/1986 | Curtis et al. | |
| 4,794,368 A | 12/1988 | Grossheim et al. | |
| 4,807,154 A | 2/1989 | Scully et al. | |
| 4,807,155 A | 2/1989 | Cree et al. | |
| 4,817,018 A | 3/1989 | Cree et al. | |
| 4,819,191 A | 4/1989 | Scully et al. | |
| 4,831,552 A | 5/1989 | Scully et al. | |
| 4,845,464 A | 7/1989 | Drori et al. | |
| 4,854,092 A | 8/1989 | Chatenay epouse | |
| 4,866,611 A | 9/1989 | Cree et al. | |
| 4,870,575 A | 9/1989 | Rutenberg | |
| 4,881,179 A | 11/1989 | Vincent | |
| 4,942,599 A | 7/1990 | Gordon et al. | |
| 4,953,075 A | 8/1990 | Nau et al. | |
| 5,023,851 A * | 6/1991 | Murray et al. ................. | 368/41 |
| 5,050,077 A | 9/1991 | Vincent | |
| 5,050,088 A | 9/1991 | Buckler et al. | |

(Continued)

OTHER PUBLICATIONS

Conducting a well-managed meeting.(Management) MacLeod, Les Physician Executive , 37 , 6 , 80(6) Nov.-Dec. 2011.*

(Continued)

*Primary Examiner* — William Rankins
(74) *Attorney, Agent, or Firm* — Mark Vallone, Esq.; Dmitry Andreev, Esq.; Heslin Rothenberg Farley & Mesiti P.C.

(57) ABSTRACT

Methods, systems, apparatuses, and computer program products for confirming attendance of prospective attendees to a meeting or events via time management or event scheduling applications, such as calendar applications, are disclosed. Various embodiments comprise scheduling the meeting, waiting for a period of time, and automatically sending confirmation requests to one or more prospective attendees of the meeting. Some embodiments also comprise sending invitations to and receiving acceptances by one or more prospective attendees. Some embodiments further comprise receiving one or more responses to the confirmation requests from the prospective attendees. Some embodiments may reschedule the meeting, or events of the meeting, based upon responses to the confirmation requests. Various embodiments may send or receive the confirmation requests and responses via instant messaging (IM) messages, e-mail messages, and short message service (SMS) messages.

37 Claims, 6 Drawing Sheets

U.S. PATENT DOCUMENTS

| | | |
|---|---|---|
| 5,070,470 A | 12/1991 | Scully et al. |
| 5,124,912 A | 6/1992 | Hotaling et al. |
| 5,197,000 A | 3/1993 | Vincent |
| 5,199,009 A | 3/1993 | Svast |
| 5,243,643 A | 9/1993 | Sattar et al. |
| 5,261,045 A | 11/1993 | Scully et al. |
| 5,303,145 A | 4/1994 | Griffin et al. |
| 5,305,454 A | 4/1994 | Record et al. |
| 5,323,314 A | 6/1994 | Baber et al. |
| 5,329,590 A | 7/1994 | Pond |
| 5,381,585 A | 1/1995 | Olson et al. |
| 5,387,011 A | 2/1995 | Freund |
| 5,388,258 A | 2/1995 | Larsson et al. |
| 5,428,784 A | 6/1995 | Cahill, Jr. |
| 5,483,588 A | 1/1996 | Eaton et al. |
| 5,491,626 A | 2/1996 | Williams et al. |
| 5,500,938 A | 3/1996 | Cahill et al. |
| 5,521,589 A | 5/1996 | Mondrosch et al. |
| 5,526,485 A | 6/1996 | Brodsky |
| 5,528,745 A | 6/1996 | King et al. |
| 5,588,991 A | 12/1996 | Hongo et al. |
| 5,594,857 A | 1/1997 | King et al. |
| 5,621,663 A | 4/1997 | Skagerling |
| 5,634,016 A | 5/1997 | Steadham, Jr. et al. |
| 5,634,135 A | 5/1997 | Hollander |
| 5,664,063 A | 9/1997 | Johnson et al. |
| 5,692,125 A | 11/1997 | Schloss et al. |
| 5,758,147 A | 5/1998 | Chen et al. |
| 5,774,867 A | 6/1998 | Fitzpatrick et al. |
| 5,790,974 A | 8/1998 | Tognazzini |
| 5,799,315 A | 8/1998 | Rainey et al. |
| 5,812,055 A | 9/1998 | Candy et al. |
| 5,813,013 A | 9/1998 | Shakib et al. |
| 5,842,009 A | 11/1998 | Borovoy et al. |
| 5,845,257 A | 12/1998 | Fu et al. |
| 5,848,395 A | 12/1998 | Edgar et al. |
| 5,860,918 A | 1/1999 | Schradi et al. |
| 5,890,418 A | 4/1999 | Song |
| 5,893,073 A | 4/1999 | Kasso et al. |
| 5,899,979 A | 5/1999 | Miller et al. |
| 5,903,845 A | 5/1999 | Buhrmann et al. |
| 5,909,655 A | 6/1999 | Canadas et al. |
| 5,930,471 A | 7/1999 | Milewski et al. |
| 5,933,778 A | 8/1999 | Buhrmann et al. |
| 5,936,542 A | 8/1999 | Kleinrock et al. |
| 5,960,406 A | 9/1999 | Rasansky et al. |
| 5,963,913 A | 10/1999 | Henneuse et al. |
| 6,016,346 A | 1/2000 | Rittmueller et al. |
| 6,016,478 A | 1/2000 | Zhang et al. |
| 6,018,343 A | 1/2000 | Wang et al. |
| 6,034,683 A | 3/2000 | Mansour et al. |
| 6,035,278 A | 3/2000 | Mansour |
| 6,058,415 A | 5/2000 | Polcyn |
| 6,064,974 A | 5/2000 | Broekhuijsen |
| 6,064,976 A | 5/2000 | Tolopka |
| 6,085,166 A | 7/2000 | Beckhardt et al. |
| 6,101,480 A | 8/2000 | Conmy et al. |
| 6,104,788 A | 8/2000 | Shaffer et al. |
| 6,119,147 A | 9/2000 | Toomey et al. |
| 6,173,343 B1 | 1/2001 | Delorme |
| 6,192,183 B1 | 2/2001 | Taniguchi et al. |
| 6,208,996 B1 | 3/2001 | Ben-Shachar et al. |
| 6,272,074 B1 | 8/2001 | Winner |
| 6,278,456 B1 | 8/2001 | Wang et al. |
| 6,317,777 B1 | 11/2001 | Skarbo et al. |
| 6,324,517 B1 | 11/2001 | Bingham et al. |
| 6,360,217 B1 | 3/2002 | Gopal et al. |
| 6,370,566 B2 | 4/2002 | Discolo et al. |
| 6,378,771 B1 | 4/2002 | Cooper |
| 6,396,512 B1 | 5/2002 | Nickerson |
| 6,424,995 B1 | 7/2002 | Shuman |
| 6,434,571 B1 | 8/2002 | Nolte |
| 6,459,928 B2 | 10/2002 | Mika et al. |
| 6,463,274 B1 | 10/2002 | Robertson |
| 6,463,463 B1 | 10/2002 | Godfrey et al. |
| 6,487,585 B1 | 11/2002 | Yurkovic |
| 6,571,281 B1 | 5/2003 | Nickerson |
| 6,603,489 B1 | 8/2003 | Edlund et al. |
| 6,604,079 B1 | 8/2003 | Ruvolo et al. |
| 6,619,908 B2 | 9/2003 | Bruno et al. |
| 6,629,129 B1 | 9/2003 | Bookspan et al. |
| 6,636,888 B1 | 10/2003 | Bookspan et al. |
| 6,640,230 B1 | 10/2003 | Alexander et al. |
| 6,647,370 B1 | 11/2003 | Fu et al. |
| 6,689,947 B2 | 2/2004 | Ludwig |
| 6,708,282 B1 | 3/2004 | McCarthy et al. |
| 6,781,920 B2 | 8/2004 | Bates et al. |
| 6,826,121 B1 | 11/2004 | Olexa |
| 6,828,989 B2 | 12/2004 | Cortright |
| 6,833,525 B1 | 12/2004 | Clement et al. |
| 6,856,333 B2 | 2/2005 | Ullmann et al. |
| 6,904,368 B2 | 6/2005 | Reshef et al. |
| 6,944,448 B1 | 9/2005 | Bobst |
| 6,944,610 B2 | 9/2005 | Moore et al. |
| 6,947,830 B1 | 9/2005 | Froloff et al. |
| 6,978,246 B1 | 12/2005 | Ruvolo et al. |
| 6,985,920 B2 | 1/2006 | Bhattacharya et al. |
| 6,988,128 B1 | 1/2006 | Alexander et al. |
| 7,020,714 B2 | 3/2006 | Kalyanaraman et al. |
| 7,027,995 B2 | 4/2006 | Kaufman et al. |
| 7,039,596 B1 | 5/2006 | Lu |
| 7,047,291 B2 | 5/2006 | Breese et al. |
| 7,064,336 B2 | 6/2006 | Archer et al. |
| 7,092,934 B1 | 8/2006 | Mahan et al. |
| 7,108,173 B1 | 9/2006 | Wang et al. |
| 7,130,902 B2 | 10/2006 | Bradley et al. |
| 7,139,379 B2 | 11/2006 | Kobrosly et al. |
| 7,149,776 B1 | 12/2006 | Roy et al. |
| 7,149,810 B1 | 12/2006 | Miller et al. |
| 7,158,980 B2 | 1/2007 | Shen |
| 7,200,638 B2 | 4/2007 | Lake |
| 7,231,423 B1 | 6/2007 | Horstmann et al. |
| 7,233,933 B2 | 6/2007 | Horvitz et al. |
| 7,251,786 B2 | 7/2007 | Wynn et al. |
| 7,277,888 B2 | 10/2007 | Gelormine et al. |
| 7,283,970 B2 | 10/2007 | Cragun et al. |
| 7,293,159 B2 | 11/2007 | Doering et al. |
| 7,299,405 B1 | 11/2007 | Lee et al. |
| 7,305,437 B2 | 12/2007 | Horvitz et al. |
| 7,305,441 B2 | 12/2007 | Mathewson, II et al. |
| 7,321,940 B1 | 1/2008 | Smith et al. |
| 7,337,124 B2 | 2/2008 | Corral |
| 7,337,343 B2 | 2/2008 | Barrenscheen et al. |
| 7,343,312 B2 | 3/2008 | Capek et al. |
| 7,344,444 B2 | 3/2008 | Suzuki |
| 7,355,622 B2 | 4/2008 | Clarke et al. |
| 7,355,623 B2 | 4/2008 | Cutler |
| 7,362,350 B2 | 4/2008 | Cutler |
| 7,383,291 B2 | 6/2008 | Guiheneuf et al. |
| 7,385,613 B1 | 6/2008 | Shukla |
| 7,395,221 B2 | 7/2008 | Doss et al. |
| 7,395,497 B1 | 7/2008 | Chaulk et al. |
| 7,430,535 B2 | 9/2008 | Dougherty et al. |
| 7,458,080 B2 | 11/2008 | Parker et al. |
| 7,487,234 B2 | 2/2009 | Doss et al. |
| 7,490,122 B2 | 2/2009 | Horvitz et al. |
| 7,493,369 B2 | 2/2009 | Horvitz et al. |
| 7,499,942 B2 | 3/2009 | Simison et al. |
| 7,502,606 B2 | 3/2009 | Flynt et al. |
| 7,509,234 B2 | 3/2009 | Unnikrishnan et al. |
| 7,519,663 B1 | 4/2009 | Bostick et al. |
| 7,519,676 B2 | 4/2009 | Horvitz et al. |
| 7,519,924 B2 | 4/2009 | Bocking et al. |
| 7,530,021 B2 | 5/2009 | Cheng et al. |
| 7,552,393 B2 | 6/2009 | Hayes-Roth |
| 7,571,210 B2 | 8/2009 | Swanson et al. |
| 7,574,665 B2 | 8/2009 | Cortright |
| 7,584,114 B2 | 9/2009 | Estrada et al. |
| 7,584,253 B2 | 9/2009 | Curbow et al. |
| 7,617,308 B2 | 11/2009 | Doss et al. |
| 7,644,032 B2 | 1/2010 | Etkin |
| 7,679,518 B1 | 3/2010 | Pabla et al. |
| 7,689,448 B2 | 3/2010 | Fu et al. |
| 7,689,521 B2 | 3/2010 | Nodelman et al. |
| 7,693,736 B1 | 4/2010 | Chu et al. |
| 7,703,048 B2 | 4/2010 | Alford, Jr. et al. |
| 7,707,123 B2 | 4/2010 | Bleumer |

| | | | | | | |
|---|---|---|---|---|---|---|
| 7,707,256 B2 | 4/2010 | Rollin et al. | | 2004/0153445 A1 | 8/2004 | Horvitz et al. |
| 7,730,404 B2 | 6/2010 | May et al. | | 2004/0168133 A1 | 8/2004 | Wynn et al. |
| 7,739,210 B2 | 6/2010 | Horvitz et al. | | 2004/0186737 A1 | 9/2004 | Roberts |
| 7,747,458 B2 | 6/2010 | Lyle et al. | | 2004/0193735 A1 | 9/2004 | Peleska et al. |
| 7,747,459 B2 | 6/2010 | Doss et al. | | 2004/0210827 A1 | 10/2004 | Burg et al. |
| 7,752,066 B2 | 7/2010 | Doss et al. | | 2004/0215498 A1 | 10/2004 | Leist |
| 7,765,478 B2 | 7/2010 | Reed et al. | | 2004/0217385 A1 | 11/2004 | Barrenscheen et al. |
| 7,773,307 B2 | 8/2010 | Shih | | 2004/0221286 A1 | 11/2004 | Ali et al. |
| 7,783,988 B2 | 8/2010 | Curran | | 2004/0236593 A1 | 11/2004 | Swanson et al. |
| 7,792,253 B2 | 9/2010 | Agapi et al. | | 2004/0236830 A1 | 11/2004 | Nelson et al. |
| 7,805,676 B2 | 9/2010 | Schemers et al. | | 2004/0243677 A1 | 12/2004 | Curbow et al. |
| 7,827,240 B1 | 11/2010 | Atkins et al. | | 2004/0243942 A1 | 12/2004 | Cortright |
| 7,831,805 B2 | 11/2010 | Doering et al. | | 2004/0249775 A1 | 12/2004 | Chen |
| 7,840,451 B2 | 11/2010 | Kaiser | | 2004/0249776 A1 | 12/2004 | Horvitz et al. |
| 7,840,543 B2 | 11/2010 | Guiheneuf et al. | | 2004/0255308 A1 | 12/2004 | Leban et al. |
| 7,849,102 B2 | 12/2010 | Murillo et al. | | 2004/0258222 A1 | 12/2004 | Kobrosly et al. |
| 7,860,700 B2 | 12/2010 | Behm et al. | | 2004/0260763 A1 | 12/2004 | Bhattacharya et al. |
| 7,865,387 B2 | 1/2011 | Mansour | | 2005/0010464 A1 | 1/2005 | Okuno et al. |
| 7,868,905 B2 | 1/2011 | Kerr | | 2005/0021485 A1 | 1/2005 | Nodelman et al. |
| 7,870,192 B2 | 1/2011 | Greenlee et al. | | 2005/0027805 A1 | 2/2005 | Aoki |
| 7,876,714 B2 | 1/2011 | Ethier et al. | | 2005/0031191 A1 | 2/2005 | Venkatachalam |
| 7,881,232 B2 | 2/2011 | Bieselin et al. | | 2005/0038690 A1 | 2/2005 | Hayes-Roth |
| 7,881,233 B2 | 2/2011 | Bieselin | | 2005/0038914 A1 | 2/2005 | Prendergast et al. |
| 7,908,325 B1 | 3/2011 | Pabla et al. | | 2005/0065832 A1 | 3/2005 | Virta |
| 7,912,695 B2 | 3/2011 | Krishnamurthy et al. | | 2005/0076037 A1 | 4/2005 | Shen |
| 7,912,845 B2 | 3/2011 | Barstow | | 2005/0080859 A1 | 4/2005 | Lake |
| 7,912,901 B2 | 3/2011 | Chakra et al. | | 2005/0102245 A1 | 5/2005 | Edlund et al. |
| 7,925,528 B2 | 4/2011 | Biazetti et al. | | 2005/0102356 A1 | 5/2005 | Manion et al. |
| 2001/0014866 A1 | 8/2001 | Conmy et al. | | 2005/0114191 A1 | 5/2005 | Atkin et al. |
| 2001/0054072 A1 | 12/2001 | Discolo et al. | | 2005/0129334 A1 | 6/2005 | Wilder et al. |
| 2002/0032592 A1 | 3/2002 | Krasnick et al. | | 2005/0132004 A1 | 6/2005 | Horvitz et al. |
| 2002/0038234 A1 | 3/2002 | Fu et al. | | 2005/0132005 A1 | 6/2005 | Horvitz et al. |
| 2002/0062403 A1 | 5/2002 | Burnett et al. | | 2005/0132006 A1 | 6/2005 | Horvitz et al. |
| 2002/0065689 A1 | 5/2002 | Bingham et al. | | 2005/0137887 A1 | 6/2005 | Porter et al. |
| 2002/0086034 A1 | 7/2002 | Gelder | | 2005/0138066 A1* | 6/2005 | Finke-Anlauff et al. .. 707/104.1 |
| 2002/0131565 A1 | 9/2002 | Scheuring et al. | | 2005/0160367 A1 | 7/2005 | Sirota et al. |
| 2002/0144136 A1 | 10/2002 | Stornetta et al. | | 2005/0172105 A1 | 8/2005 | Doering et al. |
| 2002/0174199 A1 | 11/2002 | Horvitz | | 2005/0177404 A1 | 8/2005 | Hyttinen |
| 2002/0180813 A1 | 12/2002 | Ullmann et al. | | 2005/0185600 A1 | 8/2005 | Nicholls |
| 2002/0184063 A1 | 12/2002 | Kaufman et al. | | 2005/0195515 A1 | 9/2005 | Bruner et al. |
| 2002/0188490 A1 | 12/2002 | Kruse | | 2005/0197877 A1 | 9/2005 | Kalinoski |
| 2002/0190975 A1 | 12/2002 | Kerr | | 2005/0216639 A1 | 9/2005 | Sparer et al. |
| 2003/0014491 A1 | 1/2003 | Horvitz et al. | | 2005/0216842 A1 | 9/2005 | Keohane et al. |
| 2003/0018724 A1 | 1/2003 | Mathewson et al. | | 2005/0243166 A1 | 11/2005 | Cutler |
| 2003/0036941 A1 | 2/2003 | Leska et al. | | 2005/0243167 A1 | 11/2005 | Clarke et al. |
| 2003/0046304 A1 | 3/2003 | Peskin et al. | | 2005/0243168 A1 | 11/2005 | Cutler |
| 2003/0049118 A1 | 3/2003 | Bruno et al. | | 2005/0256754 A1 | 11/2005 | Nastacio |
| 2003/0050982 A1 | 3/2003 | Chang | | 2005/0259603 A1 | 11/2005 | Hamzy et al. |
| 2003/0055724 A1 | 3/2003 | Battin et al. | | 2005/0262164 A1 | 11/2005 | Guiheneuf et al. |
| 2003/0103415 A1 | 6/2003 | Bates et al. | | 2005/0276406 A1 | 12/2005 | Keohane et al. |
| 2003/0105820 A1 | 6/2003 | Haims et al. | | 2006/0004676 A1 | 1/2006 | Bleumer |
| 2003/0115385 A1 | 6/2003 | Adamane et al. | | 2006/0009987 A1 | 1/2006 | Wang |
| 2003/0130882 A1 | 7/2003 | Shuttleworth et al. | | 2006/0016386 A1 | 1/2006 | Cho et al. |
| 2003/0147309 A1 | 8/2003 | Weisberg | | 2006/0041648 A1 | 2/2006 | Horvitz |
| 2003/0149606 A1 | 8/2003 | Cragun et al. | | 2006/0045029 A1 | 3/2006 | Ethier et al. |
| 2003/0182265 A1 | 9/2003 | Robbins | | 2006/0045030 A1 | 3/2006 | Bieselin |
| 2003/0184590 A1 | 10/2003 | Will | | 2006/0045253 A1 | 3/2006 | Bieselin et al. |
| 2003/0191989 A1 | 10/2003 | O'Sullivan | | 2006/0047557 A1 | 3/2006 | Bieselin et al. |
| 2003/0195833 A1 | 10/2003 | Baranowski | | 2006/0052965 A1 | 3/2006 | Nodwell |
| 2003/0195961 A1 | 10/2003 | Breese et al. | | 2006/0085284 A1 | 4/2006 | Cardenas |
| 2003/0204474 A1 | 10/2003 | Capek et al. | | 2006/0095859 A1 | 5/2006 | Bocking et al. |
| 2003/0217073 A1 | 11/2003 | Walther et al. | | 2006/0122861 A1 | 6/2006 | Scott et al. |
| 2003/0220826 A1 | 11/2003 | Mansour | | 2006/0147009 A1 | 7/2006 | Greenlee et al. |
| 2003/0233265 A1* | 12/2003 | Lee et al. .................. 705/8 | | 2006/0161906 A1 | 7/2006 | Becker et al. |
| 2003/0236796 A1 | 12/2003 | Easter et al. | | 2006/0168254 A1 | 7/2006 | Norton et al. |
| 2004/0003042 A1 | 1/2004 | Horvitz et al. | | 2006/0171257 A1 | 8/2006 | Cormier et al. |
| 2004/0054726 A1 | 3/2004 | Doss et al. | | 2006/0184885 A1 | 8/2006 | Hayes et al. |
| 2004/0059614 A1* | 3/2004 | Brown et al. ............. 705/8 | | 2006/0190547 A1 | 8/2006 | Bhogal et al. |
| 2004/0064585 A1 | 4/2004 | Doss et al. | | 2006/0195354 A1 | 8/2006 | Borovoy et al. |
| 2004/0068743 A1 | 4/2004 | Parry et al. | | 2006/0200374 A1 | 9/2006 | Nelken |
| 2004/0093163 A1 | 5/2004 | Reshef et al. | | 2006/0206222 A1 | 9/2006 | Dyer |
| 2004/0093290 A1 | 5/2004 | Doss et al. | | 2006/0215025 A1 | 9/2006 | Le Maigat et al. |
| 2004/0100741 A1 | 5/2004 | Bosga et al. | | 2006/0224430 A1 | 10/2006 | Butt |
| 2004/0111307 A1 | 6/2004 | Demsky et al. | | 2006/0224969 A1 | 10/2006 | Marston |
| 2004/0117446 A1 | 6/2004 | Swanson | | 2006/0241998 A1 | 10/2006 | Rokosz et al. |
| 2004/0119927 A1 | 6/2004 | Kang et al. | | 2006/0256037 A1 | 11/2006 | Kerr |
| 2004/0122721 A1 | 6/2004 | Lasorsa | | 2006/0265262 A1 | 11/2006 | Kamdar et al. |
| 2004/0128267 A1 | 7/2004 | Berger et al. | | 2006/0265263 A1 | 11/2006 | Burns |
| 2004/0128304 A1 | 7/2004 | Rokosz | | 2006/0265418 A1 | 11/2006 | Dolezal et al. |

| | | | |
|---|---|---|---|
| 2006/0271419 A1 | 11/2006 | O'Sullivan | |
| 2006/0285533 A1* | 12/2006 | Divine et al. ............... 370/352 | |
| 2006/0287905 A1 | 12/2006 | Stoner | |
| 2006/0293943 A1 | 12/2006 | Tischhauser et al. | |
| 2007/0005406 A1 | 1/2007 | Assadian et al. | |
| 2007/0005408 A1 | 1/2007 | Boss et al. | |
| 2007/0005409 A1 | 1/2007 | Boss et al. | |
| 2007/0005691 A1 | 1/2007 | Pushparaj | |
| 2007/0008911 A1 | 1/2007 | MacFarlane et al. | |
| 2007/0011231 A1 | 1/2007 | Manion et al. | |
| 2007/0016646 A1 | 1/2007 | Tendjoukian et al. | |
| 2007/0033086 A1 | 2/2007 | Christensen et al. | |
| 2007/0055560 A1 | 3/2007 | Quinn | |
| 2007/0055669 A1 | 3/2007 | Murillo et al. | |
| 2007/0055730 A1 | 3/2007 | Bagley et al. | |
| 2007/0071209 A1 | 3/2007 | Horvitz et al. | |
| 2007/0073810 A1 | 3/2007 | Adams et al. | |
| 2007/0079260 A1 | 4/2007 | Bhogal et al. | |
| 2007/0124575 A1 | 5/2007 | Koue et al. | |
| 2007/0136686 A1 | 6/2007 | Price et al. | |
| 2007/0143399 A1 | 6/2007 | Qi | |
| 2007/0143412 A1 | 6/2007 | Qi | |
| 2007/0143468 A1 | 6/2007 | Serenyi et al. | |
| 2007/0143842 A1 | 6/2007 | Turner et al. | |
| 2007/0150503 A1 | 6/2007 | Simison et al. | |
| 2007/0168243 A1 | 7/2007 | Chen et al. | |
| 2007/0174104 A1 | 7/2007 | O'Sullivan et al. | |
| 2007/0185752 A1 | 8/2007 | Curran | |
| 2007/0186002 A1 | 8/2007 | Campbell et al. | |
| 2007/0186193 A1 | 8/2007 | Curran | |
| 2007/0197239 A1 | 8/2007 | Sane | |
| 2007/0226034 A1 | 9/2007 | Khan | |
| 2007/0226035 A1 | 9/2007 | Doss et al. | |
| 2007/0236334 A1 | 10/2007 | Borovoy et al. | |
| 2007/0239506 A1 | 10/2007 | Jania et al. | |
| 2007/0260510 A1 | 11/2007 | Chrzan et al. | |
| 2007/0265902 A1 | 11/2007 | Brennen et al. | |
| 2007/0279483 A1 | 12/2007 | Beers et al. | |
| 2007/0280459 A1 | 12/2007 | Yee et al. | |
| 2007/0288278 A1* | 12/2007 | Alexander et al. ............... 705/8 | |
| 2007/0294120 A1 | 12/2007 | Berstis et al. | |
| 2007/0299710 A1 | 12/2007 | Haveliwala | |
| 2007/0300163 A1 | 12/2007 | Alford et al. | |
| 2007/0300165 A1 | 12/2007 | Haveliwala | |
| 2008/0015922 A1 | 1/2008 | Nelken | |
| 2008/0016442 A1 | 1/2008 | Khoo | |
| 2008/0021760 A1 | 1/2008 | Doss et al. | |
| 2008/0022209 A1 | 1/2008 | Lyle | |
| 2008/0033957 A1 | 2/2008 | Forstall et al. | |
| 2008/0052217 A1 | 2/2008 | Etkin | |
| 2008/0075104 A1 | 3/2008 | Horio et al. | |
| 2008/0091504 A1 | 4/2008 | Lyle et al. | |
| 2008/0092108 A1 | 4/2008 | Corral | |
| 2008/0098202 A1 | 4/2008 | Doering et al. | |
| 2008/0098408 A1 | 4/2008 | Koch | |
| 2008/0109517 A1 | 5/2008 | Sarkar et al. | |
| 2008/0114840 A1 | 5/2008 | Rollin et al. | |
| 2008/0126948 A1 | 5/2008 | Daniels et al. | |
| 2008/0133282 A1 | 6/2008 | Landar et al. | |
| 2008/0134041 A1 | 6/2008 | Zinn | |
| 2008/0140487 A1 | 6/2008 | Fendelman et al. | |
| 2008/0140488 A1 | 6/2008 | Oral et al. | |
| 2008/0141142 A1 | 6/2008 | Lyle et al. | |
| 2008/0141145 A1 | 6/2008 | Klausmeier | |
| 2008/0147469 A1 | 6/2008 | Murillo et al. | |
| 2008/0147471 A1 | 6/2008 | Singh et al. | |
| 2008/0154687 A1 | 6/2008 | Lin | |
| 2008/0155403 A1 | 6/2008 | Moses et al. | |
| 2008/0159511 A1 | 7/2008 | Keohane et al. | |
| 2008/0162019 A1 | 7/2008 | Carlill | |
| 2008/0162234 A1 | 7/2008 | Lu et al. | |
| 2008/0168156 A1 | 7/2008 | Haff et al. | |
| 2008/0177611 A1 | 7/2008 | Sommers et al. | |
| 2008/0177887 A1 | 7/2008 | Theilmann | |
| 2008/0189619 A1 | 8/2008 | Reed et al. | |
| 2008/0191009 A1 | 8/2008 | Gressel et al. | |
| 2008/0195448 A1 | 8/2008 | May | |
| 2008/0201207 A1 | 8/2008 | Gaia et al. | |
| 2008/0222529 A1 | 9/2008 | Castelli et al. | |
| 2008/0228342 A1 | 9/2008 | Turfkruyer | |
| 2008/0228547 A1 | 9/2008 | Doss et al. | |
| 2008/0229216 A1 | 9/2008 | Bagley et al. | |
| 2008/0235287 A1 | 9/2008 | Bocking et al. | |
| 2008/0243582 A1 | 10/2008 | Chen et al. | |
| 2008/0243948 A1 | 10/2008 | Guiheneuf et al. | |
| 2008/0270211 A1 | 10/2008 | Vander Veen et al. | |
| 2008/0288316 A1 | 11/2008 | Chakra et al. | |
| 2008/0288319 A1 | 11/2008 | Christensen et al. | |
| 2008/0288435 A1 | 11/2008 | Doss et al. | |
| 2008/0294482 A1* | 11/2008 | Bank et al. ............... 705/8 | |
| 2008/0294483 A1 | 11/2008 | Williams | |
| 2008/0307323 A1 | 12/2008 | Coffman et al. | |
| 2009/0005408 A1 | 1/2009 | Arkenau-Maric et al. | |
| 2009/0006161 A1 | 1/2009 | Chen et al. | |
| 2009/0006608 A1 | 1/2009 | Gupta et al. | |
| 2009/0018878 A1 | 1/2009 | Baron et al. | |
| 2009/0018903 A1 | 1/2009 | Iyer | |
| 2009/0026264 A1 | 1/2009 | Yamakawa et al. | |
| 2009/0029724 A1 | 1/2009 | Hardy et al. | |
| 2009/0030609 A1 | 1/2009 | Orttung et al. | |
| 2009/0030769 A1 | 1/2009 | Orttung et al. | |
| 2009/0036148 A1 | 2/2009 | Yach | |
| 2009/0043559 A1 | 2/2009 | Behm et al. | |
| 2009/0049338 A1 | 2/2009 | Unnikrishnan et al. | |
| 2009/0055235 A1 | 2/2009 | Oral et al. | |
| 2009/0055236 A1 | 2/2009 | O'Sullivan et al. | |
| 2009/0063239 A1 | 3/2009 | Baron et al. | |
| 2009/0063993 A1 | 3/2009 | Nyamgondalu | |
| 2009/0070236 A1 | 3/2009 | Cohen et al. | |
| 2009/0070678 A1 | 3/2009 | Landar et al. | |
| 2009/0077183 A1 | 3/2009 | Bruce et al. | |
| 2009/0083105 A1 | 3/2009 | Bhogal et al. | |
| 2009/0083106 A1 | 3/2009 | Bhogal et al. | |
| 2009/0089133 A1 | 4/2009 | Johnson et al. | |
| 2009/0094085 A1 | 4/2009 | Kantarjiev et al. | |
| 2009/0094088 A1 | 4/2009 | Chen et al. | |
| 2009/0094532 A1 | 4/2009 | Lyle et al. | |
| 2009/0099932 A1 | 4/2009 | Ahopelto | |
| 2009/0100347 A1 | 4/2009 | Schemers et al. | |
| 2009/0112923 A1 | 4/2009 | Chang | |
| 2009/0122729 A1 | 5/2009 | Nicholls | |
| 2009/0124839 A1 | 5/2009 | Dumesic et al. | |
| 2009/0125817 A1 | 5/2009 | O'Sullivan et al. | |
| 2009/0125917 A1 | 5/2009 | Parker et al. | |
| 2009/0146775 A1 | 6/2009 | Bonnaud et al. | |
| 2009/0148827 A1 | 6/2009 | Argott | |
| 2009/0157414 A1 | 6/2009 | O'Sullivan et al. | |
| 2009/0157466 A1 | 6/2009 | Bank et al. | |
| 2009/0157676 A1 | 6/2009 | Shanbhag | |
| 2009/0157822 A1 | 6/2009 | Chakra et al. | |
| 2009/0164293 A1 | 6/2009 | Coley | |
| 2009/0165022 A1 | 6/2009 | Madsen et al. | |
| 2009/0168609 A1 | 7/2009 | Weir et al. | |
| 2009/0172097 A1 | 7/2009 | O'Sullivan et al. | |
| 2009/0172592 A1 | 7/2009 | Schirmer et al. | |
| 2009/0177469 A1 | 7/2009 | Findlay | |
| 2009/0183080 A1 | 7/2009 | Thakkar et al. | |
| 2009/0196123 A1 | 8/2009 | Gautam | |
| 2009/0199113 A1 | 8/2009 | McWhinnie et al. | |
| 2009/0203317 A1 | 8/2009 | Waung | |
| 2009/0210351 A1 | 8/2009 | Bush et al. | |
| 2009/0210364 A1 | 8/2009 | Adi et al. | |
| 2009/0210391 A1 | 8/2009 | Hall et al. | |
| 2009/0216595 A1 | 8/2009 | Coulomb et al. | |
| 2009/0216601 A1 | 8/2009 | B.S. | |
| 2009/0217176 A1 | 8/2009 | Coulomb et al. | |
| 2009/0220104 A1 | 9/2009 | Allison | |
| 2009/0228321 A1 | 9/2009 | Srinivasan et al. | |
| 2009/0234921 A1 | 9/2009 | Dudley | |
| 2009/0240972 A1 | 9/2009 | Simison et al. | |
| 2009/0254615 A1 | 10/2009 | Baliga et al. | |
| 2009/0265203 A1 | 10/2009 | Marcus et al. | |
| 2009/0265623 A1 | 10/2009 | Kho et al. | |
| 2009/0267748 A1 | 10/2009 | Bailey | |
| 2009/0276498 A1 | 11/2009 | Lyle et al. | |
| 2009/0281843 A1 | 11/2009 | Coffman et al. | |
| 2009/0281860 A1 | 11/2009 | Bhogal et al. | |
| 2009/0282125 A1 | 11/2009 | Jeide et al. | |

| | | |
|---|---|---|
| 2009/0282361 A1 | 11/2009 | Cortright |
| 2009/0289797 A1 | 11/2009 | Sakama |
| 2009/0307044 A1 | 12/2009 | Chakra et al. |
| 2009/0307616 A1 | 12/2009 | Nielsen |
| 2009/0313074 A1 | 12/2009 | Harpur et al. |
| 2009/0313075 A1 | 12/2009 | O'Sullivan et al. |
| 2009/0319292 A1 | 12/2009 | Warner et al. |
| 2009/0319319 A1 | 12/2009 | Oral et al. |
| 2009/0319482 A1 | 12/2009 | Norlander et al. |
| 2009/0319926 A1 | 12/2009 | Chakra et al. |
| 2009/0327019 A1 | 12/2009 | Addae et al. |
| 2009/0327227 A1 | 12/2009 | Chakra et al. |
| 2009/0327433 A1 | 12/2009 | Comertoglu et al. |
| 2009/0327919 A1 | 12/2009 | Grant et al. |
| 2010/0010855 A1 | 1/2010 | Cheng et al. |
| 2010/0030788 A1 | 2/2010 | Chen et al. |
| 2010/0031218 A1 | 2/2010 | Ramsour et al. |
| 2010/0037151 A1 | 2/2010 | Ackerman et al. |
| 2010/0042704 A1 | 2/2010 | Chakra et al. |
| 2010/0049562 A1 | 2/2010 | White et al. |
| 2010/0050185 A1 | 2/2010 | Doss et al. |
| 2010/0057516 A1 | 3/2010 | Goraly |
| 2010/0070312 A1 | 3/2010 | Hunt |
| 2010/0070640 A1 | 3/2010 | Allen, Jr. et al. |
| 2010/0076802 A1 | 3/2010 | Bhogal et al. |
| 2010/0076804 A1 | 3/2010 | Jones |
| 2010/0077152 A1 | 3/2010 | Jain |
| 2010/0085416 A1 | 4/2010 | Hegde et al. |
| 2010/0088144 A1 | 4/2010 | Collet et al. |
| 2010/0097687 A1 | 4/2010 | Lipovetskaya et al. |
| 2010/0100413 A1 | 4/2010 | O'Sullivan |
| 2010/0114614 A1 | 5/2010 | Sharpe |
| 2010/0114934 A1 | 5/2010 | Martensson |
| 2010/0121666 A1 | 5/2010 | Niazi |
| 2010/0125478 A1 | 5/2010 | Bisht |
| 2010/0125479 A1 | 5/2010 | Ravikumar et al. |
| 2010/0153160 A1 | 6/2010 | Bezemer et al. |
| 2010/0169141 A1 | 7/2010 | Mansour |
| 2010/0169145 A1 | 7/2010 | O'Sullivan et al. |
| 2010/0169451 A1 | 7/2010 | Barry |
| 2010/0172479 A1 | 7/2010 | Lynch et al. |
| 2010/0174576 A1 | 7/2010 | Naylor |
| 2010/0174998 A1 | 7/2010 | Lazarus et al. |
| 2010/0175001 A1 | 7/2010 | Lazarus et al. |
| 2010/0179753 A1 | 7/2010 | Agarwal et al. |
| 2010/0180212 A1 | 7/2010 | Gingras et al. |
| 2010/0185932 A1 | 7/2010 | Coffman et al. |
| 2010/0185933 A1 | 7/2010 | Coffman et al. |
| 2010/0188485 A1 | 7/2010 | Abrams |
| 2010/0191566 A1 | 7/2010 | Loring et al. |
| 2010/0211425 A1 | 8/2010 | Govindarajan |
| 2010/0212675 A1 | 8/2010 | Walling et al. |
| 2010/0214875 A1 | 8/2010 | Wilson et al. |
| 2010/0217644 A1 | 8/2010 | Lyle et al. |
| 2010/0223088 A1 | 9/2010 | Martin et al. |
| 2010/0228602 A1 | 9/2010 | Gilvar et al. |
| 2010/0228825 A1 | 9/2010 | Hegde et al. |
| 2010/0228849 A1 | 9/2010 | Moore et al. |
| 2010/0241483 A1 | 9/2010 | Haynes et al. |
| 2010/0241845 A1 | 9/2010 | Alonso |
| 2010/0241970 A1 | 9/2010 | May et al. |
| 2010/0246792 A1 | 9/2010 | Acosta et al. |
| 2010/0250321 A1 | 9/2010 | Farrell et al. |
| 2010/0257007 A1 | 10/2010 | Chan et al. |
| 2010/0262926 A1 | 10/2010 | Gupta et al. |
| 2010/0306018 A1 | 12/2010 | Burtner et al. |
| 2010/0332278 A1 | 12/2010 | Stern et al. |
| 2010/0332282 A1 | 12/2010 | Bradley et al. |
| 2011/0010209 A1 | 1/2011 | McNally |
| 2011/0015961 A1 | 1/2011 | Chan |
| 2011/0016410 A1 | 1/2011 | Do et al. |
| 2011/0035680 A1 | 2/2011 | Borovoy et al. |
| 2011/0040591 A1 | 2/2011 | Durocher et al. |
| 2011/0040599 A1 | 2/2011 | Guruprasad et al. |
| 2011/0041133 A1 | 2/2011 | Amini et al. |
| 2011/0046588 A1 | 2/2011 | Jensen et al. |
| 2011/0066468 A1 | 3/2011 | Huang et al. |
| 2011/0071971 A1 | 3/2011 | Parks et al. |

OTHER PUBLICATIONS

Chen, Yen-Fu et al., "Systems and Methods for Managing Events of Event Scheduling Applications," U.S. Patent Application filed on Jun. 27, 2007, U.S. Appl. No. 11/769,605, Group Art Unit 3623, pp. -33.

United States Patent and Trademark Office, Non Final Office action, U.S. Appl. No. 11/769,605, dated May 16, 2011 (33 pages).

Padwick, Gordan, Special Edition Using Microsoft Outlook 2000, Chapter 10 Managing Calendars, dated May 12, 1999 (10 pages).

United States Patent and Trademark Office, Amendment in Response to Non Final Office action, U.S. Appl. No. 11/769,605, dated Aug. 10, 2011. (13 pages).

United States Patent and Trademark Office, Communication to Record Substance of Interview, U.S. Appl. No. 11/769,605, dated Aug. 10, 2011. (3 pages).

United States Patent and Trademark Office, Final Office action, U.S. Appl. No. 11/769,605, dated Sep. 19, 2011 (25 pages).

United States Patent and Trademark Office, Amendment in Response to Final Office action, U.S. Appl. No. 11/769,605, dated Dec. 19, 2011. (15 pages).

Dusseault, Lisa and Whitehead, Jim. "Open Calendar Sharing and Scheduling with CalDAV", IEEE Internet Computing, Mar.-Apr. 2005, vol. 9, Issue 2, pp. 81-89.

U.S. Appl. No. 11/769,605, filed Jan. 27, 2007 (43 pages).

United States Patent and Trademark Office, Final Office action, dated Aug. 27, 2010, U.S. Appl. No. 11/769,605 (28 pages).

United States Patent and Trademark Office, NonFinal Office action, dated Jan. 5, 2010, U.S. Appl. No. 11/769,605 (24 pages).

* cited by examiner

200

| | EVENT #1 CONFIRM ALL? N /205 | EVENT #2 CONFIRM ALL? Y /210 /207 | EVENT #3 CONFIRM ALL? N /215 /212 | EVENT #4 CONFIRM ALL? N /220 |
|---|---|---|---|---|
| TITLE 225 | TITLE #1 | TITLE #2 | TITLE #3 | TITLE #4 |
| SUPERVISOR 230 | SUPERVISOR #1 | SUPERVISOR #2 | SUPERVISOR #3 | SUPERVISOR #4 |
| TEAM LEADER 235 | TEAM LEADER #1 236 CONFIRM? Y | TEAM LEADER #2 237 CONFIRM? Y | TEAM LEADER #3 238 CONFIRM? Y | TEAM LEADER #4 239 CONFIRM? Y |
| TEAM MEMBERS 240 | MEMBER1 A MEMBER2 A MEMBER3 MEMBER4 A MEMBER5 D | *MEMBER1 D *MEMBER2 242 | MEMBER1 A MEMBER2 MEMBER3 D MEMBER4 D 243 | *MEMBER1 C MEMBER2 D MEMBER3 *MEMBER4 A MEMBER5 D MEMBER6 MEMBER7 A |
| LINK 245 | LINK #1A 250 | LINK #2A 255 | LINK #3A | LINK #4A LINK #4B |
| TIME SCHEDULED | 2:00 PM | 2:30 PM | 3:00 PM | 3:30 PM |

ATTENDEE MEETING / EVENT CONFIRMATION

405 — YOU PREVIOUSLY ACCEPTED AN INVITATION TO THE FOLLOWING MEETING:

QUARTERLY REVIEW MEETING FOR PROJECT 1234

410 — ON THE FOLLOWING DATE    415 — WITH A DURATION OF

10/06/2006    30 MIN

TO PARTICIPATE IN THE FOLLOWING EVENT:

EQUIPMENT PURCHASING STATUS

420

AND WERE SCHEDULED TO ATTEND DURING THE FOLLOWING TIME SLOT(S):

8:00AM - 8:30AM

430

440 — PLEASE CONFIRM YOUR ATTENDANCE OF THE MEETING

450 — ⦿ I PLAN TO ATTEND DURING THE SCHEDULED TIME

○ PLEASE SEE IF THE FOLLOWING CAN ATTEND FOR ME:

460 — ALTERNATE ATTENDEE(S): PERSON G

○ I CANNOT ATTEND THE MEETING    470

480

SEND CONFIRMATION RESPONSE

FIG. 4

METHODS, SYSTEMS, AND APPARATUSES FOR AUTOMATED CONFIRMATIONS OF MEETINGS

FIELD

The present invention generally relates to the fields of time management, appointment scheduling, event scheduling, meeting management, and calendaring applications. More particularly, the present invention relates to systems, methods, and computer program products for automatic confirmations of meetings in time management or event scheduling applications, such as calendar applications.

BACKGROUND

Time management and event scheduling applications have become integral parts of the lives of many people. People use calendar applications to help them manage business schedules and daily activities, such as for making appointments for various types of meetings. Electronic calendar applications, such as Lotus Notes®, Microsoft Outlook®, Mozilla® Sunbird™, and other types of calendaring and e-mail suites or programs provide capabilities for scheduling meetings.

People, such as managers and team leaders, use calendar applications or time management applications to schedule meetings with their respective employees or team members. A person may use the calendar application to schedule a meeting time and send invitations for the meeting to prospective attendees. Each attendee invited to the meeting may accept, decline, or ignore the invitation. The calendar applications may notify the person scheduling the meeting which attendees have accepted, declined, and ignored the invitations. The calendar applications may update or make appropriate entries, or reservations, in the calendars of the attendees or invitees which have accepted the invitations to attend the meeting.

One drawback of existing calendar applications is they generally do not have any automatic follow-up or auditing capabilities. The existing calendar and time management applications do not allow for automatic confirmation of attendance by invitees or prospective attendees. For example, a meeting coordinator may use a calendaring application to schedule a meeting and send out meeting invitations. Unfortunately, many of the prospective attendees to the meeting may accept the meeting invitations and plan to attend but have conflicts arise which prevent them from attending the meeting. If the meeting coordinator does not follow-up with the prospective attendees, such as by calling or sending an e-mail reminder, he or she may be surprised to find that many of the prospective attendees have changed their schedules and will not attend. Additionally, with poor attendance, the purpose or objective of holding the meeting may become moot due to the poor attendance. For example, the purpose of the meeting may be to give a series of presentations to a general manager. If the general manager cannot attend the meeting, the goal of the meeting is rendered unachievable.

BRIEF DESCRIPTION OF THE DRAWINGS

Aspects of the embodiments will become apparent upon reading the following detailed description and upon reference to the accompanying drawings in which like references may indicate similar elements:

FIG. 2 depicts an embodiment of a screen that a meeting coordinator may use to create meetings, including the creation of events for the meetings, for which the meeting coordinator may wish to have automated confirmation of attendance by one or more prospective attendees;

FIG. 4 shows an embodiment of a confirmation interface screen that a prospective attendee may see when a time management program sends a confirmation request;

DETAILED DESCRIPTION OF EMBODIMENTS

Figure 1:
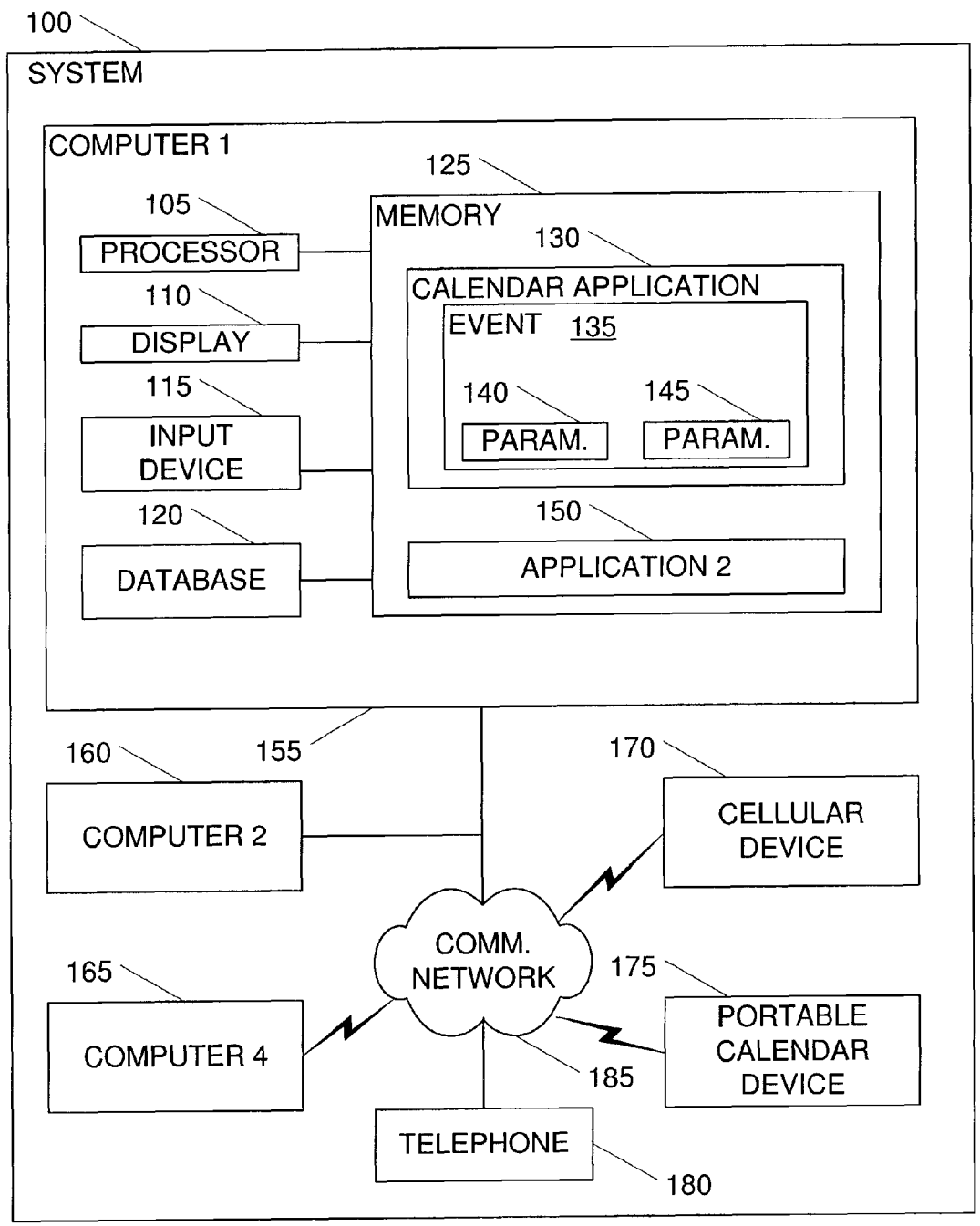
FIG. 1 depicts a system for scheduling a meeting with events, with the capability to automatically confirm meeting attendance.

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, the present invention relates to systems, apparatuses, methods, and computer program products for automatic confirmations of meetings in time management or event scheduling applications, such as calendar applications. One embodiment comprises a method of confirming attendance to a meeting. The method comprises scheduling the meeting, waiting for a period of time, and automatically sending confirmation requests to one or more prospective attendees of the meeting. Some embodiments also comprise sending invitations to, and receiving acceptances by, one or more of the prospective attendees. Some embodiments further comprise receiving one or more responses to the confirmation requests from the prospective attendees.

One or more embodiments may also notify a meeting coordinator about one or more of the responses. Some embodiments involve rescheduling the meeting events based upon one or more of the responses to the confirmation requests, such as a response involving a declination to attend the meeting by a prospective attendee whose attendance has been designated as mandatory. Various embodiments may employ various methods of sending the confirmation requests and/or receiving the responses to the requests. For example, embodiments may send or receive the requests and/or responses via instant messaging (IM) messages, e-mail messages, and short message service (SMS) messages.

Various embodiments may determine whether events of the meeting are occurring within their scheduled time slots, or more generally whether the meeting events are on schedule. When the events are not occurring on schedule, one or more of the embodiments may send one or more rescheduling requests to prospective attendees. Further embodiments may also determine an arrangement of events for the meeting based on selected time slots for events of the meeting received from prospective attendees.

Some embodiments involve scheduling one or more events in calendar applications of prospective attendees, which may include designating the meeting or event as pending until after acceptance and/or confirmation. Various embodiments may perform numerous actions upon the sending of the confirmation requests, such as canceling the meeting, determining whether to reschedule the meeting, notifying a meeting coordinator of one or more of the responses to the confirmation request, and determining an alternate arrangement of events of the meeting.

System embodiments may comprise a meeting definition module to store parameters of a meeting, such as names of prospective attendees to the meeting, a time calculation module to determine when the meeting is scheduled to begin, and a confirmation module to automatically send, based on when meeting is scheduled to begin, confirmation requests to the prospective attendees of the meeting. The system embodiments may also include an input module to enter the parameters for the meeting definition module, which may accept parameters of a start time for the meeting, a meeting end time, a meeting date, and when one or more confirmation requests are to be sent.

Alternative system embodiments may include a communication module to send invitations to prospective attendees, as well as potentially sending the confirmation requests. Various system embodiments may employ various means of sending the confirmation requests, such as by way of an e-mail, a text message, an alpha-numeric page, an SMS message, an IM message, and a telephone call and/or voice-mail message. Some embodiments may have an arrangement module to determine an arrangement of the events for the meeting.

One or more computer program product embodiments may include code for scheduling parameters for a meeting, with one of the parameters being a time to send a confirmation request to a prospective attendee of the meeting, code for determining whether the time to send the confirmation request has arrived, and code for automatically sending the confirmation at the proper time. Some embodiments may include code for sending invitations to prospective attendees, while other embodiments may include code for receiving responses to the invitations. Even further embodiments may include code to solicit input from one or more prospective attendees for events of the meeting. For some of these embodiments, the arrangement module may select an alternative arrangement based on the solicited input.

Numerous computer program products include code for receiving responses to confirmation requests, with some of those embodiments also including code to notify a meeting coordinator of the responses and/or reschedule the meeting based upon one or more responses of prospective attendees. Various embodiments include code for determining an arrangement of events for the meeting, with some of those embodiments also including code for scheduling one or more events of the arrangement in a calendar application of one or more prospective attendees. Further embodiments may also include code for detecting when an event of the meeting occurs at an unscheduled time, with some of those embodiments also having code to send notifications to prospective attendees due to the occurrence of one or more events occurring at unscheduled times.

Of the embodiments that have code for determining an arrangement of events for the meeting, some also have code for sending confirmation requests based on the arrangement. Some of the embodiments may select an alternative arrangement based upon one or more responses to confirmation requests of the prospective attendees. Various program code embodiments may include code for automatically sending confirmation requests via an IM message, an e-mail message, an SMS message, or a message by way of a telephone.

Many of the discussions use the terms "meeting coordinator" and "prospective attendee". The term "meeting coordinator" may, depending on the embodiment or the situation, mean a supervisor of a group of people. However, the term may also be interpreted to mean one of the participants to the meeting, who is a coworker of other people who will be attending the event. Additionally, the meeting coordinator may not be a person participating in the meeting at all. For example, a supervisor may ask his or her secretary to schedule a meeting, wherein the secretary may not attend the meeting. "Prospective attendee" may generally be thought of as a person who is expected to attend the meeting. However, the person may not be able to attend, for one reason or another, and may have an alternate person attend the meeting in his or her place. Additionally, worth emphasizing, is the fact that "meeting coordinator" and "prospective attendee" may refer to people who do not actually attend the meeting.

Some of the discussions use the terms "server" and "client". Generally, the term "server" may refer to a computer or device on a network that manages network resources. Clients may generally be thought of as computer applications running on computer systems that access the services provided by server applications and dedicated server computers. However, in several instances in the discussion these terms are interchangeable. Accordingly, one should not conclude that a discussion that uses only "client" or "server" terms, as opposed to using "computer" or "computer systems" terms, is meant to limit the discussion to one term or the other. One of ordinary skill in the art will recognize that such variations may be substituted for the described methods and systems, and employed in accordance with similar constraints, to perform substantially equivalent functions.

Turning to the drawings, FIG. 1 illustrates a system 100 which may comprise several different computers and calendaring devices which may be involved with automated attendance confirmation for a meeting scheduled in a calendar application 130. For example, system 100 may allow a meeting coordinator to schedule, prioritize, develop agenda items, and confirm attendance for a meeting. System 100 may comprise a network having many interconnected computing devices. For example computer 155 may comprise a desktop or laptop computer connected to a number of other computers, calendar or time management devices, and other communication devices, such as computers 160 and 165, cellular device 170, portable calendar device 175, and telephone 180. The types of devices that may connect to a computer used to confirm attendance for a meeting may vary from one embodiment to the next. For example, cellular device 170 may comprise a cellular telephone in one embodiment or a two-way pager in another embodiment. In different embodiments, portable calendar device 175 may comprise one or more of a variety of different devices, such as a Palm® organizer or a Windows Mobile® personal digital assistant (PDA) device as a couple of examples, having wireless communication capabilities.

The other computers of a system may also comprise different types of computing devices. For example, one or more computers may comprise a desktop or a laptop computer. Alternatively, in different embodiments, the computers of a system may comprise a mixture of server and client computing devices. For example, computer 155 may comprise a server running calendar application 130 that users of client computers, such as computers 160 and 165, may access.

The computers of a system, such as system 100, may connect to other computers of the system using a variety of different hardware in various embodiments. For example, computer 160 may comprise a desktop computer connected to computer 155 via an Ethernet cable coupled to a local or wide area network (LAN or WAN). Portable calendar device 175 may comprise a combination cellular telephone/PDA device coupled to computer 155 over the Internet, which may be represented by communication network 185, via a wireless virtual private network (VPN) link and located across town or in another country. In other words, various embodiments of a system like system 100 may comprise an almost limitless number of wired and wireless communication devices, allowing computers and portable devices of the system to communicate with each other, wherein the computers may be located close to or remote from each other.

The computers and other devices of a system may each execute a variety of different applications and communicate with each other in a variety of different ways, in different embodiments. For example, in addition to calendar application 130 computer 155 may run a second application 150, which may be an e-mail server application. That is to say, application 150 may comprise a simple mail transfer protocol (SMTP) server application, as an example. Calendar application 130 may work in conjunction with the SMTP application, sending e-mails to and/or receiving e-mails from users of system 100. Alternatively, application 150 may comprise a web page server, a file transfer protocol (FTP) server, a gopher server, or a telnet server, as examples. In other words, applications 130 and 150 may establish communication links or sessions with applications running on computers 160 and 165, cellular device 170, and portable communication device 175.

Applications on computers 160 and 165, as well as other devices such as portable calendar device 175, may also be SMTP server applications, telnet servers or clients, local calendaring applications, time management applications, dedicated e-mail applications, web browsers, and so on. For example, a person using portable calendar device 175 may receive a confirmation request dispatched via an e-mail. The person may retrieve the confirmation request while traveling via an e-mail program and reply with a response e-mail to computer 155. Alternatively, upon receiving the e-mail confirmation request, the person may initiate a secure web browser session with computer 155 and calendar application 130 and confirm via an interactive web page of calendar application 130.

In one or more embodiments, a system may have a processor, such as processor 105, for executing program instructions for different types of applications, such as calendar application 130 and application 150, that may be in memory 125. Using a time management application like calendar application 130 a system may implement a technique for managing business schedules and daily activities for a person or a group of people. Stated differently, a system may allow automatic coordination, scheduling, and confirmation of meetings and other types of activities, wherein the meetings and activities may have multiple time slots as or events of the activities. Additionally, a calendar application may allow automatic coordination, scheduling, and attendance confirmation by interacting with other calendar and/or personal information manager applications running on the computers and devices of other users, such as users of computers 160 and 165, cellular device 170, and portable calendar device 175. As examples, calendar application 130 may comprise Lotus Notes®, interacting with Pocket Microsoft Outlook® on portable calendar device 175 or Mozilla® Sunbird™ on computer 165. A calendar application of a system, such as calendar application 130, may send confirmation requests to prospective attendees for meetings and events of those meetings. The calendar application may also receive confirmation responses from one or more of the users and perform such actions as canceling the meeting if a necessary person, such as a person designated as mandatory, will be unable to attend or simply notifying the meeting coordinator of confirmations and cancellations.

A system may display data of a calendar application on a monitor or other computer display, such as display 110. For example, display 110 may allow a meeting coordinator to view scheduled meetings, activities or events of the meetings, confirmations, and cancellations related to those meetings or events for calendar application 130. Display 110 may also show input from other users for events to be scheduled by calendar application 130 and allow the user of computer 155 to view responses to confirmation requests from prospective attendees. Using input device 115 the user of computer 155 may schedule the meetings and request that confirmation requests be automatically sent to prospective attendees. For example, input device 115 may comprise a keyboard and/or a mouse. In some embodiments input device 115 may comprise a tablet and stylus, such as a pressure-sensitive surface of a PDA that recognizes hand-written characters. In even further embodiments input device 115 may comprise an audible input device, such as a microphone used for speech recognition.

A system may automatically schedule meetings and activities based on parameters related to events of the activities. As depicted in FIG. 1, calendar application 130 may have an event 135 having parameter 140 and parameter 145. Event 135 may represent an item for a meeting, such as a speech or a presentation. While not depicted in FIG. 1, calendar application 130 may have many more events than event 135. For example, calendar application 130 may have twenty appointments scheduled for a particular week. Appointments may be things such as meetings, telephone conferences, and performance reviews, just to name a few. Some of the appointments may have numerous events or sub-meetings associated with them. System 100 may divide the appointments into discrete events and use parameters associated with the events, such as parameters 140 and 145, which may include input from people associated with the events, to prioritize and/or arrange the events. In other words, system 100 may place events for a meeting in a particular order or more generally plan or organize the events, based on parameters of the events which may include input from users involved with the events. One set of parameters may comprise confirmation and/or cancellations from prospective attendees. A specific example will help illustrate this concept.

A user of computer 165 may be scheduled to give a presentation. User of computer 165 may receive a meeting invitation from the user of computer 155, which may be the meeting coordinator or meeting chair. The user of computer 165 may be responsible for a small portion of the presentation that only requires forty minutes during a meeting which is scheduled to last 3 hours. Various other prospective attendees may be similarly situated. All prospective attendees may have received invitations, responded to the invitations saying that they would each be available for the entire 3 hours, and given prioritized preferences for particular time slots in which they would each like to give his/her presentation. With an automatic scheduling feature of system 100, which may allow flexibility for invitee attendance of only specific portions or time slots of the meeting, or sub-meetings, calendar application 130 may select an arrangement or order of the events based on the invitation responses received from the users (e.g.—parameters 140 and 145).

For example, calendar application 130 may schedule the presentation for user of computer 165 for the first hour, based on his invitation response preferences. After the initial creation, invitation, and scheduling of the meeting based on invitation responses, the user of computer 165 may have a conflict arise during the time that he is scheduled for the presentation. Calendar application 130 may send out confirmation requests to the prospective attendees. User of computer 165 may respond, saying that he is no longer available during the first hour but can give his presentation at a later time. Calendar application 130 may receive his confirmation response, as well as the responses to confirmation requests of other prospective attendees, and reschedule or reprioritize the order of events, such that another prospective attendee gives her presentation during the first hour and the user of computer 165 gives his presentation at a later time. Based on the new order of events for the meeting, or agenda, calendar application 130 may send out a revised meeting agenda to the prospective attendees via e-mail. In an alternative embodiment, calendar application may only notify those people who are affected by the change in schedule.

Depending on the embodiment, the time slots that prospective attendees have chosen may be updated in real-time. For example, if the user of portable calendar device 175 receives an invitation, opens it, and then goes to lunch, when the user of the portable calendar device 175 returns and someone else has already chosen a slot, then system 100 may gray out that slot or otherwise disable the slot on the calendar of the screen of portable calendar device 175. In other words, the system may indicate that the slot is "reserved" or "pending" for one or more prospective attendees. Consequently, the user of portable calendar device 175 may accept the invitation to the meeting for a different time slot. However, when calendar application 130 sends out confirmation requests to prospective attendees, the confirmation requests may allow the prospective attendees to indicate that they are confirming their originally scheduled time slot, but will be available to attend or give a presentation at another time in the meeting. In other words, the confirmation aspect of a calendar or time management application may allow the application to dynamically reschedule or rearrange events of a meeting based on prospective attendee availability and preferences based on the information of responses to confirmation requests.

Alternatively, in one or more embodiments, the time slots may not be exclusive. In other words, many attendees may have the ability to attend the same slot. An example where this scenario may be appropriate is a meeting that gives an overview of a several newly released products of a company. An attendee may only wish to attend the portion of the presentation that relates to the product he or she has worked on and sign up for only that slot, or the attendee may wish to stay and view other products of coworkers and sign up for those slots as well. The calendar or time management application may allow such acceptance of overlapping time slot attendance, as well as confirmation of the overlapping attendance.

The calendar applications of computers in system, may communicate with each other using a variety of communication protocols. For example, applications 130 and 150 may use simple mail transfer protocol, FTP, or Hyper Text Transfer Protocol (HTTP). Additionally, depending on the embodiment, the computers of a system may run various types of operating systems. For example, computers 155, 160, and 165 may run Unix®, Microsoft® Windows®, OS/2®, Linux®, DOS, or Mac OS®. Each computer may run the same operating system as the others or a different one.

Appointments and related items of calendar application 130 may be stored in a database 120. For example, database 120 may comprise a calendar database for calendar application 130, storing lists of appointments, events, invitation acceptances, and lists of parameters for the events, and responses to confirmation requests of appointments and events. A system may store a database in a mass storage device. For example database 120 may reside on a parallel or serial hard disk drive. Database 120 may also be stored on an optical storage device, such as a rewritable compact disc (CD) or a digital versatile disc (DVD) drive. In other embodiments, database 120 may reside in a flash memory device, such as a universal serial bus (USB) thumb drive.

While the preceding example discussed a system 100 employing local memory 125 and a local database 120, alternative embodiments may comprise a system executing or accessing programs and documents in remote locations. For example, calendar application 130 may actually comprise two programs, one on a local client system and another on a remote server system. The local client program may be a web browser running a Java application for a web page of a calendar or time management application. The time management web page may have been downloaded from a remote server system. The user of computer 155 may use application 130 to insert parameters 140 and 145, review and approve schedules arranged by system 100, and modify activity events and event parameters. As a person skilled in the art will quickly appreciate, system 100 may comprise numerous communication and networking configurations, with almost unlimited combinations of local and remote event scheduling applications.

FIG. 2 depicts one embodiment of a screen 200 that a meeting coordinator may use to create meetings, including the creation of events for the meetings. Assume, for the purpose of an example, that the meeting coordinator has a weekly two hour meeting from 2:00-4:00 P.M. that consists of four time slots, thirty (30) minutes each, where a topic or event is discussed or covered during each time slot. In other words, four different topics may be addressed in the meeting, each within its own time slot of thirty minutes.

Screen 200 illustrates four events (events 205, 210, 215, and 220) in columnar format. The meeting coordinator may use a title field 225 to assign a title to each of the events. Additionally, the meeting coordinator may be able to enter details for individual supervisors responsible for each of the events using supervisor field 230, details for the team leader responsible for each event using team leader field 235, and members of the team that participate or contribute to the individual events using team members field 240. In some embodiments, the meeting coordinator may type in this information. In other embodiments, the meeting coordinator may drag-and-drop this information into the respective fields of the events. In further embodiments, the meeting coordinator may select from information in drop-down boxes. When entering this information, the meeting coordinator may preliminarily assign each event to a tentative time slot. As depicted in FIG. 2, the meeting coordinator may have tentatively scheduled events 205, 210, 215, and 220 to begin at 2:00, 2:30, 3:00, and 3:30 p.m., respectively.

The invitees may be located in different time zones, making it a difficult challenge for the meeting coordinator to contact the prospective attendees, find out times in which they will be available, determine which times do not conflict with other attendees schedules, arrange the events in a permissible manner where all schedules are compatible, and send out the meeting invitations. Many times in scheduling a meeting in this manner, there are conflicts among the prospective attendees. Consequently, the meeting coordinator may only be able to ensure that a primary person, or a delegated person, can attend. Occasionally, the meeting coordinator may also need to take additional time to confirm attendance, via an e-mail, a telephone call, or an instant message. For example, attendees may have to alter their schedules due to intervening conflicts. As one may readily conclude, this simple task of scheduling a meeting, and confirming that prospective attendees will be able to attend, can easily get complicated and consume thirty minutes or more of work for the meeting coordinator.

The meeting coordinator may have an embodiment of the system, such as system 100, send invitations to each of the supervisors, team leaders, and team members. In other words, the supervisors, team leaders, and team members may be the prospective attendees for the meeting. Upon receiving the invitation, each of the prospective attendees may respond by indicating their preferences, such as which times they would like to attend or when they have conflicts. Additionally, depending on the embodiment, the prospective attendees may attach files related to the event, such as presentation documents, using link field 245. For example, team leaders of events 205 and 210 may attach documents via linked documents 250 and 255. Example attached documents may be electronic slides, spreadsheet files, and other types of demonstration files.

The system may receive the invitation responses, which may comprise acceptances and time slot preferences, compute or evaluate the various combinations of events occurring at different times, and determine an arrangement of events that maximizes attendance by the largest number of prospective attendees. Alternatively, the meeting coordinator may indicate which prospective attendees must attend or which prospective attendees should attend if at all possible. In other words, the meeting coordinator may assign a weight or rating to one or more of the prospective attendees, based on whether the attendance is mandatory, highly desired, suggested, requested, or only offered. In this case, the system may evaluate the various combinations using these parameters.

Additionally, the meeting coordinator and the prospective attendees may enter other parameters for the events, such as which time slots are more important than others, which time slots are unavailable for certain attendees, which topics have priority over other topics, etc. The system may use these additional parameters when evaluating the various combinations of events to determine an acceptable arrangement of events. For example, based on the parameters defined by the prospective attendees and the meeting coordinator, the system may move event 210 from 2:30 p.m. to 3:30 p.m., and event 220 from 3:30 p.m. to 2:30 p.m. due to more team members of event 220 being able to attend at 2:30 p.m. versus 3:30 p.m.

In some embodiments, screen 200 may represent the schedule proposed by the system after the system goes out, queries the calendar entries of the prospective employees, and determines a recommended or proposed schedule. The meeting coordinator may accept the proposed arrangement of events and send out invitations to the prospective attendees to have them accept or place priorities on the individual time slots, based on their preferences of when they would like to attend. The system may continually receive such feedback, or input parameters, adjust the schedule accordingly, and update the calendars of the affected attendees (as pending, alternate, confirmed, etc.) based on the adjustments. In automating this process, the system may minimize the schedule impact of the people involved.

In at least one embodiment, screen 200 may also display information pertaining to attendance confirmation requests, as well as responses to those requests, for the scheduled meeting and events. In one or more embodiments the meeting coordinator may be able to specify whether he/she would like to confirm the attendance for all prospective attendees for a particular event by using event confirmation request fields, such as event confirmation request fields 207 and 212. For example, FIG. 2 illustrates how the meeting coordinator may have requested attendance confirmations for all prospective attendees of event 210, noted by the "Y" for confirmation request field 212, yet not requested attendance confirmations for the other events, noted by the "N" for the other confirmation request fields such as confirmation request field 207.

Aside from a global-type of event confirmation request, in one or more embodiments the meeting coordinator may also be able to request attendance confirmations from individual prospective attendees, instead of all prospective attendees to an event. For example, team leader confirmation request fields 236, 237, 238, and 239 illustrate how the meeting coordinator may have requested attendance confirmations for each of the individual team leaders of the individual events. Additionally, in at least one embodiment, the meeting coordinator may also be able to request attendance confirmations from other individuals besides team leaders. For example, the meeting coordinator may have requested attendance confirmations from both members of event 210 (element 242) and a couple of members of event 220 (element 243).

Although different embodiments may indicate that attendance confirmations have been requested from individual members in different manners, at least one embodiment may indicate such requests for attendance confirmations by placing asterisks next to the name of the member. For example, the two asterisks to the left of the two team members for event 210 (element 242) may indicate that the meeting coordinator desires attendance confirmations from both of them. Similarly, the two asterisks to the left of Member1 and Member 4 for event 220 (element 243) may indicated that the meeting coordinator may desire attendance confirmations from each of them as well.

In one or more embodiments, the calendar or time management application may also display the responses from the prospective attendees for the invitation requests and attendance confirmation requests. To display such responses, the calendar application may place letters next to the names of prospective attendees representing their responses. For example, the calendar application may place an "A" next to the names of people who have accepted the original meeting or event invitation, such as Member4 of event 220. The calendar application may place a "D" next to the people who have declined either the original invitation or the confirmation request, such as Member1 of event 210. For people that have not responded to either the invitation request or the confirmation request, the calendar application may display no characters or letters, such as Member2 of event 210. After the calendar application has received a positive response to a confirmation request indicating the prospective attendee will attend, it may place a letter "C" next to their name, like Member1 of event 220.

Alternative embodiments may have fewer or more features than those just described for displaying information related to attendance confirmation. Additionally, alternative embodiments may display the information differently, such as by using different letters, or with variations of the features described. For example, the calendar application may use the letter "A" to denote that a person has accepted either the original meeting invitation or confirmed that he/she will attend by responding to the confirmation request. The calendar application may differentiate the two responses using color. For example, when the person accepts a meeting invitation, the system may display the "A" in one color, such as yellow. When the person responds to a confirmation request saying he or she will attend, the system may display the "A" in another color, such as green.

Depending on the embodiment, the system may submit proposed changes to the meeting coordinator for approval. In other words, the prospective attendees may request a new arrangement of the events but the meeting coordinator may either approve or disapprove of the changes. For example, assume a prospective attendee accepted a meeting invitation for one time slot but later confirmed that she would only be able to attend the meeting during a second time slot. The calendar application may be able to review the parameters and other feedback information from the other prospective attendees and propose an alternate schedule that meets the needs of all prospective attendees. Depending on the embodiment, the calendar application may reschedule the events and send out notices to the affected members or all of the prospective attendees. The calendar application may also allow the meeting coordinator to select whether such rescheduling is automatic, or whether the calendar application should first submit or propose the changes to the meeting coordinator for approval first.

Figure 3:
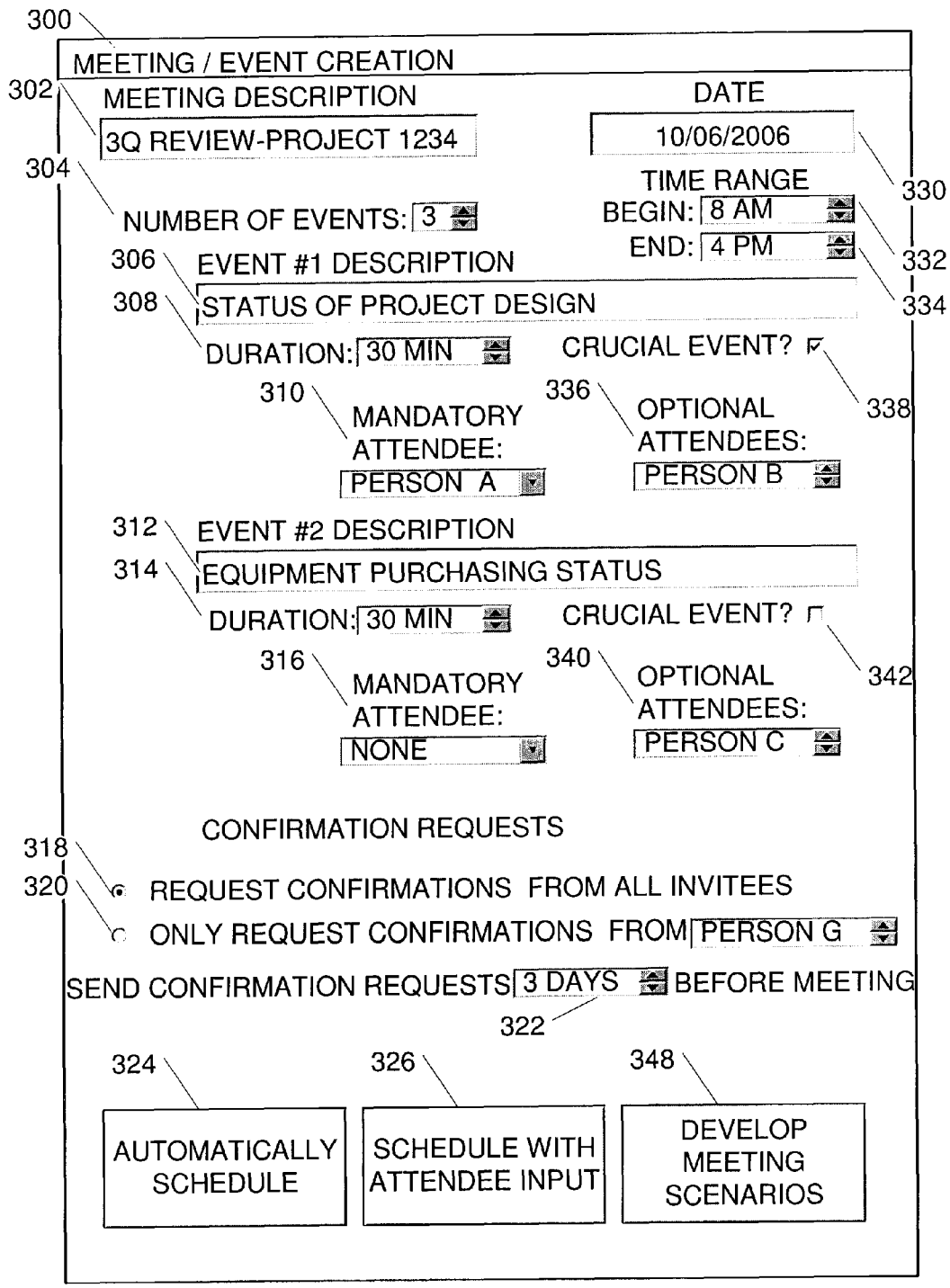
FIG. 3 shows an alternative embodiment of an interface screen that a meeting coordinator may use to schedule a meeting and request automated confirmations.

FIG. 3 illustrates an alternative embodiment of a graphical user interface (GUI) screen 300 that a meeting coordinator may use to create meetings, create events for the meetings, and request attendance confirmations for the meetings. Screen 300 may be displayed on a variety of electronic devices. For example, screen 300 may be shown on a display screen, like display 110 of system 100 in FIG. 1, which may be a liquid crystal display screen of a PDA or laptop computer, or a CRT screen of a desktop computer.

Screen 300 may contain a number of text input fields allowing the meeting coordinator to define numerous parameters associated with the meeting being created. The meeting coordinator may enter a description for the meeting using text input field 302. The meeting coordinator may enter the date on which the meeting is to occur using text input field 330. Using scroll boxes 332 and 334, the meeting coordinator may define a time range for which the system should take into consideration when attempting to define an arrangement of the events and scheduling the events in the electronic calendars of the attendees. The meeting coordinator may limit the range of time to only the amount of time needed to conduct the meeting. For example, the meeting may need to be held at a specific time for one reason or another. Alternatively, the meeting coordinator may specify an amount of time much larger than the amount of time needed to conduct the meeting. In so doing, the meeting coordinator may allow the system more flexibility in attempting to find a suitable arrangement of events compatible with the events already scheduled in the calendars of the prospective attendees, as well as more flexibility in attempting to find suitable alternative arrangements after prospective attendees cancel or confirm when they submit responses to confirmation requests.

Using scroll box 304, the meeting coordinator may define the number of events which are to occur during the meeting. The system may automatically increase or decrease the size of screen 300 to accommodate the selected number of events. As illustrated in FIG. 3, the meeting coordinator may enter descriptions 306 and 312 to describe the first and second events, respectively. Additionally, the meeting coordinator may define the duration of each event using scroll boxes 308 and 314. For example, FIG. 3 shows that the meeting coordinator has defined the durations of events #1 and #2 to be 30 minutes each.

Using drop-down boxes 310 and 316, the meeting coordinator may define mandatory attendance for each of the individual events. For example, FIG. 3 shows that "Person A" must attend event #1, while event #2 has no mandatory attendees listed. Using scroll boxes 336 and 340, the meeting coordinator may also define optional attendance for each of the individual events. Worth noting, even though FIG. 3 only shows one person in the scroll boxes for the mandatory attendees and the optional attendees, more than one person may actually be selected. For example, scroll box 340 may actually contain the names of fifteen people, not just "Person C".

The meeting coordinator may also use checkboxes 338 and 342 to define which events are crucial and which events are non-crucial. For example, FIG. 3 illustrates that the meeting coordinator has defined event #1 as a crucial event, while event #2 is non-crucial. By distinguishing crucial and non-crucial events, the meeting coordinator may allow the system to schedule only the crucial events in case an acceptable time slot cannot be found for one or more of the non-crucial events, considering invitation responses as well as responses to confirmation requests. For example, if all of the optional attendees listed in scroll box 340 respond to the invitations saying that they plan to attend but later respond to confirmation requests saying that they cannot attend the meeting, the system may propose an alternate arrangement of that includes only event #1 and cancels event #2.

In different embodiments, the calendar application may provide different ways for a meeting coordinator to send confirmation requests. For example, the meeting coordinator may want to receive responses for confirmation requests from all invitees to the meeting. To do so the meeting coordinator may select radio button 318. Alternatively, the meeting coordinator may want to receive confirmations or cancellations from only certain invitees. To do so the meeting coordinator may select radio button 320 and select one or more people in the associated scroll box.

In one or more embodiments, the calendar application may allow the meeting coordinator to choose how far in advance of the meeting that the attendance confirmation requests are sent to the prospective attendees. For example, the meeting coordinator may want the calendar application to send out the confirmation requests 3 days before the meeting by using a scroll box such as scroll box 322. The amount of time before the meeting that the calendar application automatically sends the attendance confirmation requests may be selectable or variable in some embodiments, such as in the manner just described, or the amount of time may be fixed at some default amount of time in alternative embodiments, such as 2 days.

Once the meeting coordinator has defined the preliminary parameters of the meeting, the system may offer several scheduling alternatives. For example, the meeting coordinator may click on box 324 to have the system query the calendars of prospective attendees, propose an arrangement of events compatible with those calendars, and automatically schedule the meeting without first soliciting input from the prospective attendees. The attendees may, however, view the scheduled events in their calendars and attempt to modify or change the arrangement if the parameters for the various events allow. For example, "Person B" may view her calendar and see that the meeting has been scheduled for a particular time which she cannot attend. She may indicate her inability to attend at the scheduled time by responding to a confirmation request whereupon the system may automatically attempt to reschedule the meeting. In other words, the system may automatically try to determine another arrangement of the events compatible with the alternately defined parameters.

The meeting coordinator may click on box 326 to have the system first send out electronic invitations to the meeting before scheduling it in their calendars. For example, the system may send invitations via e-mail, electronic pages to pagers, or via instant messages or text messages sent to cellular telephones or PDAs of the prospective attendees. The prospective attendees may respond to the invitation by indicating their availability and their preferences for the various proposed time slots for the events. The system may receive such feedback in the form of parameters for the events and use those parameters to select arrangement and scheduled the selected arrangement in the calendars of the attendees. Alternatively, the meeting coordinator may click on box 348 to have the system query the calendars of prospective attendees, propose one or more arrangement of events compatible with those calendars, and display those arrangements to the meeting coordinator for selection or approval.

After sending out the invitations, receiving the invitation responses and attendance preferences back from the prospective attendees, the system may develop a tentative schedule for the events of the meeting and schedule the events and meetings in the calendars of the prospective attendees. The system may then wait until a predetermined time before the meeting is scheduled to begin. For example, the system may wait until 3 days before the meeting begins, based on the selection of the meeting coordinator via scroll box 322 on screen 300, before sending out confirmation requests to the prospective attendees that are scheduled to attend. To see how a system may interact with prospective attendees in one or more embodiments and confirm their meeting attendances, we turn now to FIG. 4.

FIG. 4 shows an embodiment of an interface screen 400 that one or more of the prospective attendees to a meeting may see when a system sends them a confirmation request. In other words, a system such as system 100 shown in FIG. 1 may generate screen 400 to confirm meeting attendance. Such meeting attendance may occur in addition to the initial meeting confirmations by the prospective attendees at the time the meeting was originally scheduled. For example, responses to screen 400 may allow a meeting coordinator or the system that is scheduling the meeting to verify that the prospective attendees who previously indicated that they would attend the meeting are still able to attend or whether one or more of the prospective attendees are canceling due to conflicts that might have arisen after the initial scheduling.

A confirmation screen, such as screen 400, may remind the prospective attendee that he or she previously accepted an invitation to the meeting, wherein text display field 405 may display the description of the meeting assigned by the meeting coordinator. Text display fields 410 and 415 may display the date of the meeting and the duration of the meeting, or at least the duration of the one or more events for which the prospective attendee agreed to attend. For example, while the quarterly review meeting (element 405) may last several hours, the prospective attendee may have agreed to only participate in the equipment purchasing status portion of the meeting (element 420), which only lasts from 8:00-8:30 AM (element 430).

Screen 400 may allow the prospective attendee to confirm his or her attendance to the meeting, or event of the meeting as the case may be, in a variety of different ways. As FIG. 4 illustrates, the prospective attendee may be able to confirm that he or she will still attend during the previously scheduled time by selecting radio button 440. Alternatively, screen 400 may allow the prospective attendee to request an alternate person attend instead. For example, the prospective attendee may select one or more alternate persons, such as "Person G", using scroll box 470 and radio button 450.

Screen 400 may also allow the prospective attendee to decline attending the meeting by clicking on radio button 460. Upon indicating whether or not the prospective attendee still plans on attending the meeting, or requesting that an alternative person attend the meeting in his or her place, the prospective attendee may send the confirmation response back to the system by clicking on box 480. Upon receiving one or more confirmation responses from the prospective attendees, the system may perform a variety of actions. For example, the system may tally the numbers of confirmations and declinations and send a report to the meeting coordinator that indicates which prospective attendees still plan on attending the meeting. Alternatively, in one or more embodiments, the system may try to dynamically reschedule the meeting based on the declinations received from one or more of the prospective attendees. For example, if a prospective attendee had requested one or more alternative persons attend in his or her place using scroll box 470 and radio button 450, the system may try to schedule one or more of the alternative persons for the meeting. The system may first examine the calendars for each of the requested alternative persons to see which of them may have available timeslots for the allotted time of the meeting. The system may then send invitations to each of the alternative persons having the available time, asking them to attend the meeting. Based on the responses received from the alternative persons the system may automatically schedule one or more of them for the meeting.

If one or more of the prospective attendees, which had previously been listed as critical attendees by the meeting coordinator, send responses to the confirmation requests indicating that they will no longer be able to attend, the system may respond in different ways. For example, the system may automatically cancel the meeting and send cancellation notices to the remaining prospective attendees. Alternatively, the system may notify the meeting coordinator about the cancellations and ask the meeting coordinator whether or not she would like to cancel the meeting, or whether she would like to attempt to reschedule alternative persons to attend a meeting in the places of those prospective attendees that indicated that they will no longer be able to attend. Alternatively, in even further embodiments, the system may attempt to reschedule the meeting or rearrange the order of events for the meeting based on the confirmation responses. For example, the system may determine an alternate sequence of agenda items or arrangement of meeting events which accommodates the schedules and/or preferences of the initial invitation responses of the prospective attendees. The system may prompt the meeting coordinator and ask her whether she would like to reschedule the attendees for the alternate arrangement of meeting events. Additionally, the system may automatically send out notifications to the prospective attendees about the proposed rescheduling of the meeting and ask them if they would still be able to attend. Based on the responses, the system may be able to automatically reschedule the meeting or events of the meeting.

Figure 5:
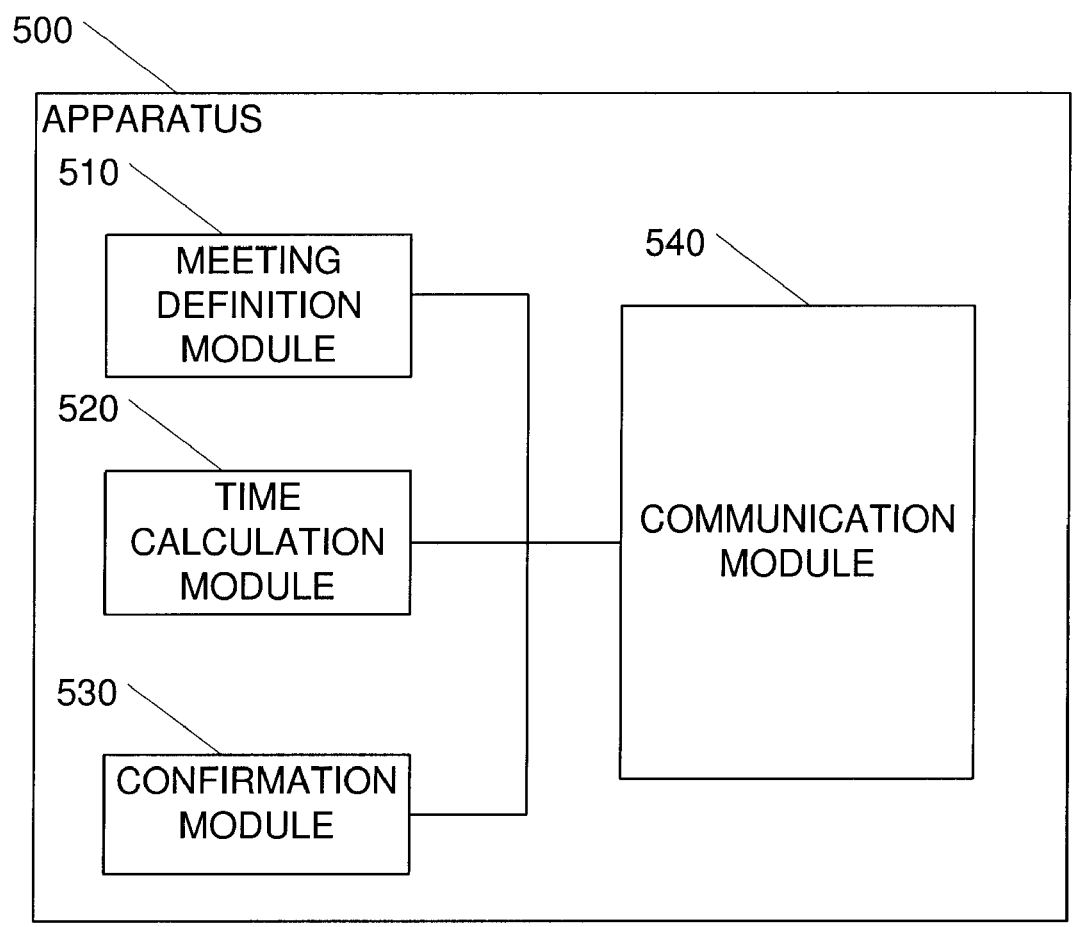
FIG. 5 shows an apparatus for automatically confirming attendance for prospective attendees of a meeting, comprising a meeting definition module, a time calculation module, a confirmation module, and a communication module.

FIG. 5 shows an apparatus 500 for automatically confirming attendance for prospective attendees of a meeting. For example, apparatus 500 may comprise part of a calendar or time management application that confirms whether prospective attendees will attend the meeting. Such confirmations may help plan and confirm attendance to the meeting, even if the calendar application reviews the calendars of prospective users when planning the meeting because the prospective attendees may not make calendar entries for meetings that they plan to attend. In other words, often times the prospective attendees may have another meeting they know they will attend, such as a lunch meeting, but fail to make entries or otherwise set aside time in their electronic calendars.

One or more elements of apparatus 500 may be in the form of hardware, software, or a combination of both hardware and software. For example, in one embodiment, all of the modules of apparatus 500 may comprise software algorithms of a calendar application, executed in memory by a processor of a computer. In other words, one embodiment of apparatus 500 may comprise portions of a calendar application, like calendar application 130, running in memory of a computer system, like system 100 shown in FIG. 1. Additionally, depending on the embodiment, the elements of apparatus 500 may reside in one or more computer systems. For example, in one embodiment, the elements of apparatus 500 may reside in a single desktop computer, wherein the apparatus communicates with other computers of the individual prospective attendees which may also run separate calendar applications. In an alternative embodiment, some elements of apparatus 500 may reside on one computing platform, such as a server, while other elements reside on another computing platform or computing device, such as communication module 540 running from a dedicated communication server.

Apparatus 500 may comprise a meeting definition module 510 to store meeting details and parameters of the meeting. For example, meeting definition module 510 may store information or data for the meeting, such as a description for the meeting, the number of events for the meeting, a description for each of the events, one or more lists of names of prospective attendees for the individual events, prioritization information for the events and/or prospective attendees, and whether confirmation requests should be sent to the prospective attendees. Additionally, meeting definition module 510 may allow the meeting coordinator to select different or variable times for sending the confirmation requests. For example, meeting definition module 510 may allow the meeting coordinator to select how far in advance of the date and time of the meeting to send the confirmation requests, such as 1 day, 2 days, a week in advance, etc.

Apparatus 500 may have a time calculation module 520, which may be a hardware module or a software module of program code, for determining whether conditions related to time for the meeting have been satisfied. For example, one of the parameters stored by meeting definition module 510 may be a time that a meeting coordinator wants a system running a calendar application to send confirmation requests to all of the prospective attendees of the meeting. Time calculation module 520 may periodically compare the desired time to send the confirmation requests with the actual system time. In other words, time calculation module 520 may determine when the time to send the confirmation requests has arrived.

Time calculation module 520 may also perform other calculations related to time such as calculating beginning and ending times for events of a meeting, when the calendar system is trying to determine a particular order or arrangement of the events based on responses to the confirmation requests of the prospective users. In other words, time calculation module 520 may perform calculations related to time when analyzing various arrangements of the events for the meeting. In other embodiments, time calculation module 520 may actually monitor the progression of meeting events and compare them with the time slots in which the events were scheduled to occur. If one or more of the events occurs at an unscheduled time, such as when an event ends prematurely or lasts longer than planned, time calculation module 520 may detect the unscheduled occurrence and initiate some type of action, such as notifying the meeting coordinator or affected prospective attendees.

Once time calculation module 520 has determined that the time to send the confirmation requests has arrived, confirmation module 530 may automatically send the confirmation requests to one or more of the prospective attendees. Confirmation module 530 may send the confirmation requests to all of the prospective attendees or only certain prospective attendees. For example, the meeting coordinator may have entered a parameter via meeting definition module 510 requiring that all prospective attendees should receive confirmation requests, or that only prospective attendees designated as having "essential" or "mandatory" attendance requirements should receive the confirmation requests. In other words, the meeting coordinator may not care if non-essential attendees attend but only mandatory attendees, such as those scheduled to give a speech or a presentation.

In order to send confirmation requests to one or more prospective attendees, apparatus 500 may have a communication module 540. While confirmation module 530 may determine which prospective attendees are to receive confirmation requests, as well as determine the type of message and actual text of the message that the prospective attendee is to receive, communication module 540 may actually send the message to the individual prospective attendees. For example, communication module 540 may comprise an e-mail application that sends e-mail confirmation requests to the prospective attendees. Alternatively, in a different embodiment, communication module 540 may comprise a hardware module that sends pages, text messages, SMS messages, IM messages, or even telephone messages to the prospective attendees. In even further embodiments, apparatus 500 may cause communication module 540 to send different types of confirmation requests to prospective attendees. For example, communication module 540 may send only e-mail confirmation requests to prospective attendees whose attendance is "optional", but send pages, IM messages, e-mail messages, and telephone messages to prospective attendees whose attendance requirement has been indicated as "mandatory".

Confirmation module 530 may also receive responses to the confirmation requests. For example, confirmation module 530 may receive a positive response or "confirmation" from a prospective attendee indicating that the prospective attendee plans to attend the meeting or event of the meeting. Confirmation module 530 may also be configured to receive negative responses or "declinations" from prospective attendees indicating that the prospective attendees will not attend the meeting at the scheduled times. Additionally, confirmation module 530 may also be configured to receive other types of responses that are neither confirmations nor declinations. For example, some prospective attendees may respond by asking that one or more other people attend in their place, or that the prospective attendees would still like to attend events of the meetings but cannot do so at the previously scheduled times.

Based on the responses that confirmation module 530 receives from the prospective users, apparatus 500 may perform a variety of other actions. In some embodiments, confirmation module 530 may send one or more summaries of the responses to the meeting coordinator, keeping her abreast of the responses when they are received by confirmation module 530. For example, in one embodiment, confirmation module 530 may work in conjunction with communication module 540 to send the meeting coordinator a text message when a mandatory prospective attendee responds saying she will not be able to attend. Alternatively, in another embodiment, apparatus 500 may have another module which tries to determine an alternative arrangement of the events, such as a different sequence of events of the meeting for the previously scheduled meeting time slot or a different time or different day on which to hold the meeting, based on the availability and/or previously submitted responses to the original meeting invitations. If apparatus 500 is able to determine an alternative arrangement conforming to the needs and availabilities of the users, apparatus 500 may cause confirmation 530 and communication module 540 to send out one or more new confirmation requests asking the prospective attendees to attend events of the alternately selected or "rescheduled" arrangement.

As noted, time calculation module 520 may monitor the progression of meeting events and detect when events occur at unscheduled times, such as when the meeting is running ahead or behind schedule. In such a situation, apparatus 500 may cause confirmation module 530 and communication module 540 to send notifications and/or new confirmation requests to prospective attendees who will be affected by the new schedule. Based on how the affected prospective attendees respond, apparatus 500 may be able to accommodate the needs of the prospective attendees. For example, say a meeting that lasts all day starts running ahead of schedule. The occurrence of this may be manually noted by the meeting coordinator or automatically detected by time calculation module 520. Apparatus 500 may tentatively reschedule the remaining events into new (earlier) time slots and cause confirmation module 530 to send out confirmation requests to the affected prospective attendees. If one of the prospective attendees indicates that he cannot attend the earlier time slot but can still attend the original time slot, apparatus 500 may propose another arrangement which moves up another prospective attendee and asks her if she can attend the earlier time slot. Again, depending on the embodiment, apparatus 500 may notify the meeting coordinator as the responses to the confirmation requests are received.

Apparatus 500 may vary in different embodiments. Some embodiments may have fewer modules than those module depicted in FIG. 5. For example, one embodiment may not have a meeting definition module 510. Input or parameters of the meetings may be generated, for example, by a meeting definition module on another system coupled to apparatus 500. In another embodiment, apparatus 500 may include a meeting input module to input or enter parameters for meeting definition module 510. Additionally, some embodiments may have different combinations of elements perform different functions. For example, in some embodiments a single module may perform the functions of both confirmation module 530 and communication module 540.

Figure 6:
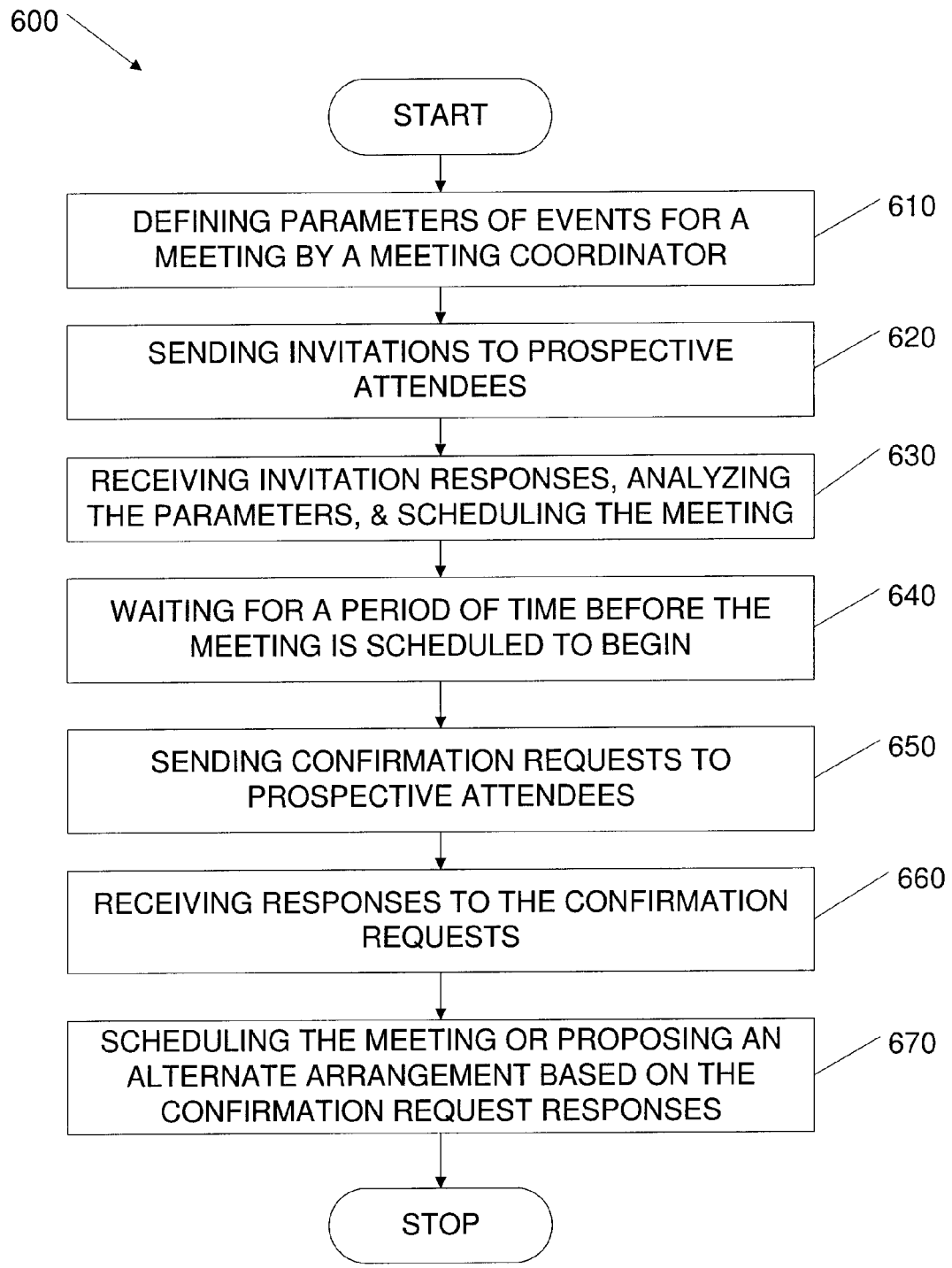
FIG. 6 illustrates one method of inviting prospective attendees to a meeting and automatically confirming attendance of the prospective attendees.

FIG. 6 illustrates a flowchart 600 of a method for confirming attendance of prospective attendees to a meeting or events of a meeting. An embodiment according to flowchart 600 begins with defining parameters of events for a meeting by a meeting coordinator (element 610). For example, a meeting coordinator may define meeting details, such as a description for the meeting, the number of events for the meeting, prospective attendees which need to attend for the individual events, whether the individual events are crucial or non-crucial, which prospective attendees whose attendance is mandatory, to whom confirmation requests should be sent, and whether the meeting should automatically be cancelled or rescheduled based upon declination responses from mandatory prospective attendees.

An embodiment of flowchart 600 continues by sending invitations to prospective attendees (element 620). For example, a system may send an e-mail to prospective attendees asking them to sign onto a website that outlines events of a meeting and allows the prospective attendees to select which events they would like to attend and what days and times the prospective attendees will be available. The system may receive invitation responses from some or all of the prospective attendees that were sent an invitation, analyze the parameters of the invitation responses, determine a date and/or arrangement of the meeting events which satisfies the largest number of prospective attendees, and schedule the meeting (element 630).

A method according to flowchart 600 may proceed by waiting for a period of time before the meeting begins (element 640) and sending confirmation requests to prospective attendees (element 650). For example, the meeting coordinator may have requested that confirmation requests only be sent to team leaders and team members scheduled to give a presentation and that the confirmation requests be sent three days before the meeting begins in order to allow enough time for all of the team leaders and team members to respond. The meeting originator may have further specified that the confirmation requests be sent via SMS messages to the cellular telephones of members who have them and sent via e-mail messages to the rest. Based on the responses received to the confirmation requests (element 660), one or more embodiments according to flowchart 600 may then schedule the meeting as the meeting was originally scheduled or, in the alternative, determine an alternate arrangement of events for the meeting (element 670). For example, if all prospective attendees confirm that they can still attend for the time slots for which they were originally scheduled, the system may send a message to the meeting coordinator indicating such responses. On the other hand, if one or more of the prospective attendees responds by saying that a conflict has arisen, the system may try to send a confirmation request to an alternative team member, asking that team member if he or she can attend instead of the originally scheduled person. If the alternate confirms that he or she can attend, the system may schedule the meeting. If the alternate declines attendance, the system may try to confirm the attendance of yet another team member and automatically cancel the meeting if no alternate attendee can be found. If the meeting is cancelled, the system may be configured to send out cancellation notices to the remaining prospective attendees.

As alluded to earlier, one or more embodiments may be implemented as a program product for use with a system to confirm attendance of prospective attendees to a meeting scheduled by a calendar or time management application, such as a calendar application in accordance with, e.g., calendar application 130 shown in FIG. 1. The program(s) of the program product may define functions of the embodiments (including the methods described herein) and can be contained on a variety of data storage media. Illustrative data storage media include, but are not limited to: (i) non-writable storage media (e.g., read-only memory devices within a computer such as CD-ROM disks readable by a CD-ROM drive); and (ii) writable storage media (e.g., floppy disks within a diskette drive or hard-disk drive). Such data storage media, when storing computer-readable instructions that direct the functions of calendaring or time management applications, represent one or more embodiments.

In general, the routines executed to implement the embodiments, may be part of an operating system or a specific application, component, program, module, object, or sequence of instructions. The computer program of the one or more embodiments may comprise a multitude of instructions that will be translated by a computer into a machine-readable format and hence executable instructions. Also, the programs may comprise variables and data structures that either reside locally to the program or are found in memory or on storage devices. In addition, various programs described hereinafter may be identified based upon the application for which they are implemented in a specific embodiment of the invention. However, it should be appreciated that any particular program nomenclature described is used merely for convenience, and thus the specific embodiments should not be limited to use solely in any specific application identified and/or implied by such nomenclature.

It will be apparent to those skilled in the art having the benefit of this disclosure that the present invention contemplates methods, systems, and program products for confirming attendance of prospective attendees to meetings scheduled via time management or event scheduling applications, such as calendar applications. It is understood that the forms of the embodiments shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Further, embodiments may achieve multiple objectives but not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for confirming attendance of a meeting, the method comprising the steps of:
    a computer storing parameters for the meeting, wherein a first parameter of the stored parameters identifies at least one prospective attendee of the meeting, and wherein a second parameter of the stored parameters identifies a category of attendance for the at least one prospective attendee;
    the computer calculating a desired time at which to send a confirmation request, the desired time being calculated based on a pre-defined amount of time before the meeting; and
    the computer, responsive to determining that the desired time to send the confirmation request is equal to an actual system time, determining a delivery method of the confirmation request based on the category of attendance of the at least one prospective attendee and sending the confirmation request to the at least one prospective attendee.

2. The method of claim 1, further comprising the steps of:
    the computer sending an event invitation to the at least one prospective attendee to invite the at least one prospective attendee to attend at least one event of the meeting; and
    the computer receiving a response to the event invitation.

3. The method of claim 1, further comprising the step of the computer receiving a response to the confirmation request.

4. The method of claim 3, further comprising the step of the computer determining an alternate arrangement of events for the meeting based on the response.

5. The method of claim 3, wherein the step of the computer receiving a response to the confirmation request comprises the computer receiving one of an instant messaging (IM) message, an e-mail message, and a short message service (SMS) message.

6. The method of claim 1, further comprising the step of the computer scheduling the meeting.

7. The method of claim 1, further comprising the step of the computer determining an arrangement of events for the meeting based on preferred time slots for events of the meeting, wherein the preferred time slots are received from a plurality of prospective attendees of the meeting.

8. The method of claim 1, wherein the step of the computer sending the confirmation request comprises the computer sending a confirmation request for an event of the meeting.

9. The method of claim 3, further comprising the computer, responsive to receiving the response to the confirmation request, performing at least one of the steps of:
    canceling the meeting;
    rescheduling the meeting;
    notifying a meeting coordinator of the response to the confirmation request;
    notifying at least one prospective attendee about the response to the confirmation request;
    updating status information of the meeting in a calendar application; and
    determining an alternate arrangement of events of the meeting.

10. A computer system for confirming attendance of a meeting, the computer system comprising:
    one or more processors, one or more computer readable memories, and one or more computer-readable tangible storage devices;
    program instructions, stored on at least one of the one or more storage devices for execution by at least one of the one or more processors via at least one of the one or more memories, to store parameters of the meeting, wherein a first parameter of the stored parameters identifies at least one prospective attendee of the meeting, and wherein a second parameter of the stored parameters identifies a category of attendance for the at least one prospective attendee;
    program instructions, stored on at least one of the one or more storage devices for execution by at least one of the one or more processors via at least one of the one or more memories, to determine a desired time at which to send a confirmation request to the at least one prospective attendee of the meeting, the desired time being calculated based on a pre-defined amount of time before the meeting;
    program instructions, stored on at least one of the one or more storage devices for execution by at least one of the one or more processors via at least one of the one or more memories, to determine a delivery method of the confirmation request based on the category of attendance of the at least one prospective attendee; and
    program instructions, stored on at least one of the one or more storage devices for execution by at least one of the one or more processors via at least one of the one or more memories, to automatically send the confirmation request to the at least one prospective attendee of the meeting in response to determining that the desired time at which to send the confirmation request has arrived.

11. The computer system of claim 10, further comprising program instructions, stored on at least one of the one or more storage devices for execution by at least one of the one or more processors via at least one of the one or more memories, to accept the parameters for the meeting.

12. The computer system of claim 11, further comprising program instructions, stored on at least one of the one or more storage devices for execution by at least one of the one or more processors via at least one of the one or more memories, to accept parameters related to a start time of the meeting, an end time of the meeting, a meeting date, and a time at which a confirmation request is to be sent.

13. The computer system of claim 10, further comprising program instructions, stored on at least one of the one or more storage devices for execution by at least one of the one or more processors via at least one of the one or more memories, to send at least one invitation to at least one prospective attendee of the meeting.

14. The computer system of claim 10, further comprising program instructions, stored on at least one of the one or more storage devices for execution by at least one of the one or more processors via at least one of the one or more memories, to select an alternative arrangement of events of the meeting based on at least one of a response to the confirmation request, a modification of the parameters by a meeting chair, and whether an event of the meeting is on schedule.

15. The computer system of claim 14, further comprising program instructions, stored on at least one of the one or more storage devices for execution by at least one of the one or more processors via at least one of the one or more memories, to send invitations based on the alternative arrangement.

16. The computer system of claim 14, further comprising program instructions, stored on at least one of the one or more storage devices for execution by at least one of the one or more processors via at least one of the one or more memories, to send confirmation requests based on the alternative arrangement.

17. The computer system of claim 16, further comprising program instructions, stored on at least one of the one or more storage devices for execution by at least one of the one or more processors via at least one of the one or more memories, to notify a meeting coordinator about responses to the confirmation requests.

18. A computer program product for confirming attendance of a meeting, the computer program product comprising:
   one or more computer-readable tangible storage devices;
   program instructions, stored on at least one of the one or more storage devices, to store parameters for the meeting, wherein a first parameter of the stored parameters identifies at least one prospective attendee of the meeting, and wherein a second parameter of the stored parameters identifies a category of attendance for the at least one prospective attendee;
   program instructions, stored on at least one of the one or more storage devices, to determine whether a desired time at which to send a confirmation request has arrived, the desired time being calculated based on a pre-defined amount of time before the meeting;
   program instructions, stored on at least one of the one or more storage devices, to determine a delivery method of the confirmation request based on the category of attendance of the at least one prospective attendee; and
   program instructions, stored on at least one of the one or more storage devices, to automatically send the confirmation request in response to determining that the desired time at which to send the confirmation request has arrived.

19. The computer program product of claim 18, further comprising program instructions, stored on at least one of the one or more storage devices, to solicit input of the parameters for events of the meeting from prospective attendees.

20. The computer program product of claim 18, further comprising program instructions, stored on at least one of the one or more storage devices, to receive responses to a plurality of confirmation requests.

21. The computer program product of claim 20, further comprising program instructions, stored on at least one of the one or more storage devices, to notify a meeting coordinator of the responses.

22. The computer program product of claim 20, further comprising program instructions, stored on at least one of the one or more storage devices, to reschedule an event of the meeting based upon a response of the at least one prospective attendee.

23. The computer program product of claim 18, further comprising program instructions, stored on at least one of the one or more storage devices, to determine an arrangement of events for the meeting.

24. The computer program product of claim 23, further comprising program instructions, stored on at least one of the one or more storage devices, to schedule an event of the arrangement in a calendar application of the at least one prospective attendee.

25. The computer program product of claim 23, further comprising program instructions, stored on at least one of the one or more storage devices, to detect when an event of the meeting occurs at an unscheduled time.

26. The computer program product of claim 25, further comprising program instructions, stored on at least one of the one or more storage devices, to send notifications to prospective attendees due to the event occurring at the unscheduled time.

27. The computer program product of claim 25, further comprising program instructions, stored on at least one of the one or more storage devices, to send confirmation requests based on the arrangement, wherein the arrangement is based upon the event occurring at the unscheduled time.

28. The computer program product of claim 23, wherein the program instructions to determine the arrangement select an alternative arrangement based upon a response to the confirmation request.

29. The computer program product of claim 18, further comprising program instructions, stored on at least one of the one or more storage devices, to configure a variable time to send the confirmation request.

30. The computer program product of claim 18, further comprising program instructions, stored on at least one of the one or more storage devices, to indicate that a time slot for an event of the meeting is either reserved or pending in a calendar application of the at least one prospective attendee.

31. The method of claim 6, wherein the step of the computer scheduling the meeting comprises the computer making an entry in a calendar application.

32. The method of claim 1, wherein the category of attendance is selected from the group consisting of: mandatory, desired, suggested, requested, and offered.

33. The method of claim 1, wherein the delivery method of the confirmation request is selected from the group consisting of: an e-mail, a page, an instant message, and a telephone message.

34. The computer system of claim 10, wherein the category of attendance is selected from the group consisting of: mandatory, desired, suggested, requested, and offered.

35. The computer system of claim 10, wherein the delivery method of the confirmation request is selected from the group consisting of: an e-mail, a page, an instant message, and a telephone message.

36. The computer program product of claim 18, wherein the category of attendance is selected from the group consisting of: mandatory, desired, suggested, requested, and offered.

37. The computer program product of claim 18, wherein the delivery method of the confirmation request is selected from the group consisting of: an e-mail, a page, an instant message, and a telephone message.

* * * * *